(12) United States Patent
Cohen et al.

(10) Patent No.: US 8,445,076 B2
(45) Date of Patent: May 21, 2013

(54) FOULING AND SCALING RESISTANT NANO-STRUCTURED REVERSE OSMOSIS MEMBRANES

(75) Inventors: Yoram Cohen, Los Angeles, CA (US); Myung-Man Kim, Los Angeles, CA (US); Gregory T. Lewis, Los Angeles, CA (US); Nancy Hsiao-Yu Lin, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 126 days.

(21) Appl. No.: 12/482,264

(22) Filed: Jun. 10, 2009

(65) Prior Publication Data

US 2009/0308804 A1    Dec. 17, 2009

Related U.S. Application Data

(60) Provisional application No. 61/060,715, filed on Jun. 11, 2008.

(51) Int. Cl.
*H05H 1/26* (2006.01)
*B05D 1/00* (2006.01)
*B01D 39/00* (2006.01)

(52) U.S. Cl.
USPC ........... 427/569; 427/401; 427/557; 427/301; 427/333; 210/500.42

(58) Field of Classification Search
USPC ............... 210/500.27, 500.35, 500.42, 321.6, 210/321.75; 427/569, 401, 557, 301, 333
See application file for complete search history.

(56) References Cited

U.S. PATENT DOCUMENTS

| | | | | |
|---|---|---|---|---|
| 4,781,733 A | * | 11/1988 | Babcock et al. | 95/49 |
| 4,784,769 A | * | 11/1988 | Giordano et al. | 210/500.21 |
| 5,028,332 A | * | 7/1991 | Ohnishi | 210/500.34 |
| 5,194,158 A | * | 3/1993 | Matson | 95/46 |
| 5,248,427 A | * | 9/1993 | Spiske et al. | 210/640 |
| 5,366,639 A | * | 11/1994 | Jones et al. | 210/787 |
| 5,693,227 A | * | 12/1997 | Costa | 210/650 |
| 5,700,372 A | * | 12/1997 | Takesawa et al. | 210/321.81 |

(Continued)

FOREIGN PATENT DOCUMENTS

WO    WO 2008/060522    *    5/2008

OTHER PUBLICATIONS

Belfert, S., Bottino, A. and Caapannelli, G. (2005), Preparation and charaterization of layeed membranes consructed by sequential redox-initiated grafting onto polyacrylonitirle ultrafiltratin membranes. J. Appl. Polym. Sci., 98:509-520,doi: 10.002/app.22142.*

(Continued)

*Primary Examiner* — Ana Fortuna
(74) *Attorney, Agent, or Firm* — Foley & Lardner LLP

(57) ABSTRACT

In one embodiment, a method of modifying a surface of a membrane includes exposing the surface to an impinging atmospheric pressure plasma source to produce an activated surface, and exposing the activated surface to a solution including a vinyl monomer. In another embodiment, a method of manufacturing a desalination membrane includes treating a surface of the membrane with an impinging atmospheric plasma source for an optimal period of time and rf power, and exposing the surface to an aqueous solution containing a vinyl monomer. In another embodiment, an apparatus includes a membrane having a surface, and polymer chains terminally grafted onto the surface of the membrane.

19 Claims, 24 Drawing Sheets

U.S. PATENT DOCUMENTS

| | | | |
|---|---|---|---|
| 6,169,127 B1* | 1/2001 | Lohmann et al. | 523/106 |
| 6,203,850 B1* | 3/2001 | Nomura | 427/245 |
| 6,465,056 B1* | 10/2002 | Chabrecek et al. | 427/557 |
| 6,465,505 B1* | 10/2002 | Amin et al. | 514/394 |
| 6,586,038 B1* | 7/2003 | Chabrecek et al. | 427/2.24 |
| 7,591,948 B2* | 9/2009 | Muller et al. | 210/645 |
| 7,677,398 B2* | 3/2010 | Belfer et al. | 210/500.38 |
| 7,704,573 B2* | 4/2010 | Itami et al. | 428/32.18 |
| 7,717,273 B2* | 5/2010 | Kozlov et al. | 210/500.27 |
| 7,882,963 B2* | 2/2011 | Mickols et al. | 210/500.38 |
| 2012/0031842 A1* | 2/2012 | Freger et al. | 210/650 |

OTHER PUBLICATIONS

Brink et al., The Anti-fouling Action of Polymers Preadsorbed on Ultrafiltration and Microfiltration Membranes, *Journal of Membrane Science*, 76 (1993), pp. 281-291.

Chen et al., Preparation of Sulfonated Polysulfone/Polysulfone and Aminated Polysulfone/Polysulfone Blend Membranes, *Journal of Applied Polymer Science*, 61 (1996), p. 1205-1209.

Chu et al., Preparation of Thermo-responsive Core-shell Microcapsules with a Porous Membrane and Poly(*N*-isopropylacrylamide) Gates, *Journal of Membrane Science*, 2001, 192, (1-2), 27-39.

Chu et al., Thermoresponsive Transport Through Porous Membranes With Grafted PNIPAM Gates, *AIcHE Journal*, vol. 49:4 (2003) 896-909.

Chung et al., Atmospheric RF Plasma Effects on the Film Adhesion Property, *Thin Solid Film*, 447-448 (2004) 354-358.

Dong et al., Plasma-Mediated Grafting of Poly(ethylene glycol) on Polyamide and Polyester Surfaces and Evaluation of Antifouling Ability of Modified Substrates, *Langmuir*, 2007, 23, (13), 7306-7313.

Kai et al., Preparation of Organic/Inorganic composite Membranes by Plasma-Graft Filing Polymerization Technique for Organic-Liquid Separation, *Industrial & Engineering Chemical Research*, 39 (2000) 3284-3290.

Lee et al., Preparation of Surface-modified Stimuli-responsive Polymeric Membranes by Plasma and Ultraviolet Grafting Methods and Their Riboflavin Permeation, *Polymer*, 1995, 36, (1), 81-85.

Lee et al., Preparation of pH/temperature Responsive Polymer Membrane by Plasma Polymerization and Its Riboflavin Permeation, *Polymer*, 1997, 38, (5), 1227-1232.

Gunther et al., Selection of Mine Water Treatment Technologies for the Emalahleni (Witbank) Water Reclamation Project, WISA Biennal Conference, Sun City, South Africa (May 2008).

Hester et al., Preparation of Protein-resistant Surfaces on Poly(vinylidene fluoride) Membranes via Surface Segregation, *Macromolecules*, 32 (1999), pp. 1643-1650.

Shenton et al., Surface Modification of Polymer Surfaces; Atmospheric Plasma Versus Vacuum Plasma Treatments, *Journal of Physics D: Applied Physics*, 34 (2001) 2761-2768.

Ulbricht et al., Surface Modification of Ultrafiltration Membranes by Low Temperature Plasma II. Graft Polymerization Onto Polyacrylonitrile and Polysulfone, *J Membrane Science*, 111 (1996), pp. 193-215.

Wang et al., Electroless Plating of Copper on Fluorinated Polyimide Films Modified by Surface Graft Copolymerization with 1-Vinylimidazole and 4-Vinylpyridine, *Polymer Engineering and Science*, 44 (2004) 362-375.

Wavhal et al., Hydrophilic Modification of Polyethersulfone Membranes by Low-Temperature Plasma-Induced Graft Polymerization, *Journal of Membrane Society*, 209 (2002) 255-269.

* cited by examiner

Membrane

Graft Polymerization    Polymer Grafting

Plasma Surface Initiation

FOULING AND SCALING RESISTANT NANO-STRUCTURED REVERSE OSMOSIS MEMBRANES

CROSS REFERENCE TO RELATED APPLICATION

This application claims the benefit of U.S. Provisional Application Ser. No. 61/060,715, entitled Fouling and Scaling Resistant Surface Nano-Structured Membranes, filed on Jun. 11, 2008, the disclosure of which is incorporated herein by reference in its entirety.

FIELD OF THE INVENTION

This invention relates to a membrane and a method for manufacturing a membrane that may be used in a reverse osmosis (RO) process, nanofiltration, and ultrafiltration. More particularly, the invention relates to RO membranes for saline water desalting while resisting biofouling and mineral salt scaling, the latter being a main problem in water desalination. In some embodiments of the invention, a plasma-induced graft polymerization process is used to manufacture the RO membranes.

BACKGROUND

In accordance with previous approaches, membrane surface graft polymerization has been typically achieved by initiation of graft polymerization or polymer grafting using chemical initiators in solution to initiate reactive surface sites or grafting of surface initiators. For polymeric membrane surfaces, resulting surface density of polymer chains by the above approaches can be limited by the steric hindrance associated with the binding of large molecular weight polymer chains (formed in solution) to the active membrane surface sites (i.e., polymer grafting) which would prevent a dense polymer brush layer. A variety of techniques have been developed to directly activate the membrane surface to reduce polymer grafting such as UV and gamma irradiation.

UV graft polymerization can be used for membrane surface graft polymerization but it can result in monomer initiation in solution from irradiation by the UV source. Therefore, polymer grafting is also expected, and thus a reduction in the resulting surface graft density may result. UV radiation is not as versatile as plasma activation since it is less energetic and is not universal in its applicability (i.e., a limited selection of polymeric material can be typically successfully activated by UV radiation).

Gamma irradiation has also been studied. It can be difficult to control the degree of surface activation, and the high-energy gamma irradiation involved can lead to membrane surface etching and thus alteration of the membrane permeability and possibly pin-holes. Moreover, the technique typically involves the use of a radioactive source, which reduces the commercial attractiveness of the technique, especially for large scale deployment.

Accordingly, there is a need for a polymerization technique that will allow the formation of high density membrane surface initiation sites while minimizing bulk polymer growth.

SUMMARY

In contrast with the above known techniques, graft polymerization that is induced by plasma membrane surface treatment, has the advantage of the formation of a high density of membrane surface initiation sites, which allow polymer chain growth directly from the membrane surface, while minimizing bulk polymer growth. The polymer layer formed is a highly dense bush or brush layer with a more uniform distribution of polymer chain sizes than other techniques, primarily due to the suppression of polymer grafting from solution. It is also important to note that plasma membrane surface initiation can be achieved over a short treatment interval to reduce the effects of membrane surface etching.

Use of low pressure plasma (i.e., under vacuum) treatment can limit the potential commercial scale applicability of the approach. Accordingly, the present approach makes use of an atmospheric pressure plasma source, thereby enabling large scale surface treatment for continuous processing for membrane fabrication processes and subsequent surface graft polymerization using either solution or gas phase reaction to create a terminally anchored polymer brush layer on the membrane surface.

In one embodiment, a method of modifying a surface of an RO membrane includes exposing the surface to atmospheric plasma and subsequently exposing the surface to a solution having a monomer. In one embodiment, the plasma impinges the surface of the RO membrane.

In some embodiments of the invention, optimal conditions for the exposure of the surface of the membrane to the plasma. Specifically, in some embodiments the optimal conditions include an optimal amount of power and an optimal exposure time period.

In one embodiment, a method of modifying a surface of a membrane includes exposing the surface to an impinging atmospheric pressure plasma source to produce an activated surface, and exposing the activated surface to a solution including a vinyl monomer.

In another embodiment, a method of manufacturing a desalination membrane includes treating a surface of the membrane with an impinging atmospheric plasma source for an optimal period of time and rf power, and exposing the surface to an aqueous solution containing a vinyl monomer.

In another embodiment, an apparatus includes a membrane having a surface, and polymer chains terminally grafted onto the surface of the membrane.

BRIEF DESCRIPTION OF THE DRAWINGS

For a better understanding of the nature and objects of some embodiments of the invention, reference should be made to the following detailed description taken in conjunction with the accompanying drawings.

FIG. 9 illustrates poly(methacrylic acid) film thickness achieved by APPI-FRGP on surrogate PA-PEI-silicon substrates for an aqueous initial monomer concentration of

[M]$_0$=5-20 vol % at 60 and 70° C. (plasma treatment time=10 s, RF power=40 W) according to an embodiment of the invention.

Figure 10A:
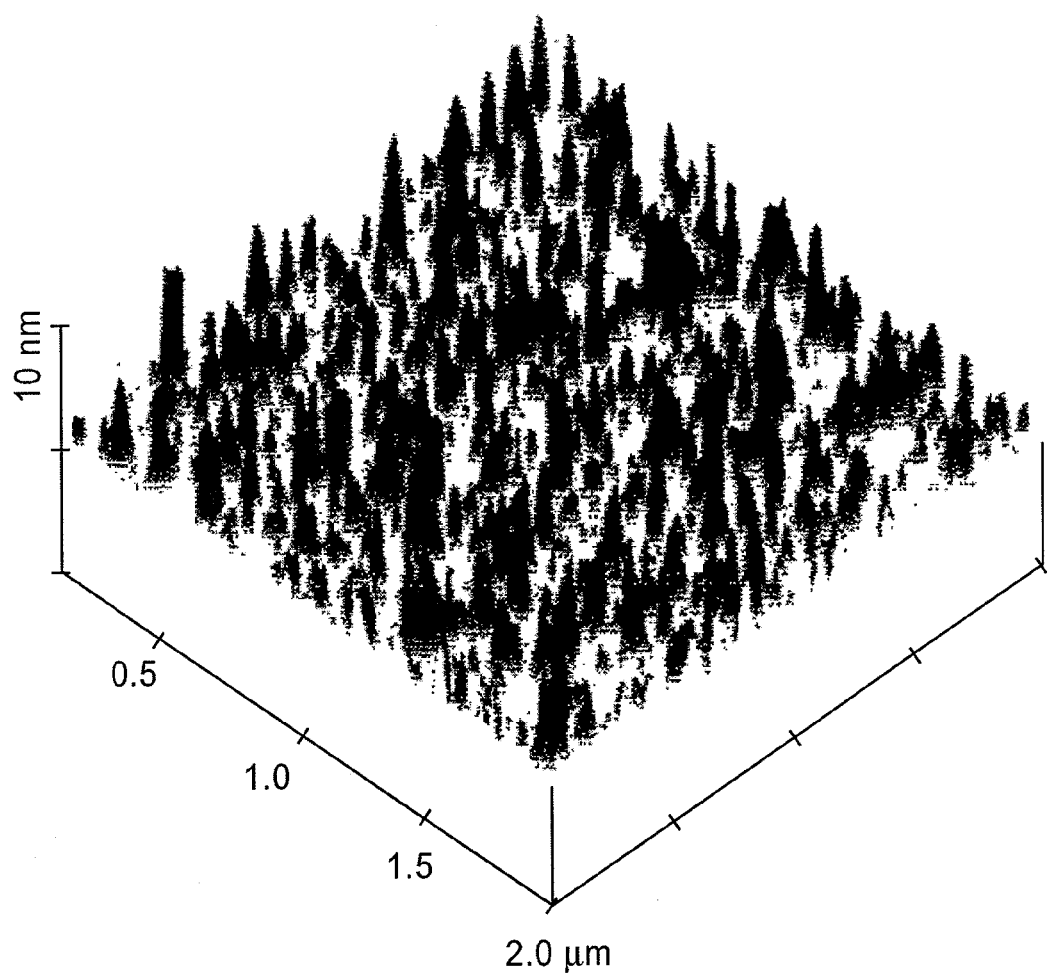
Figure 10B:
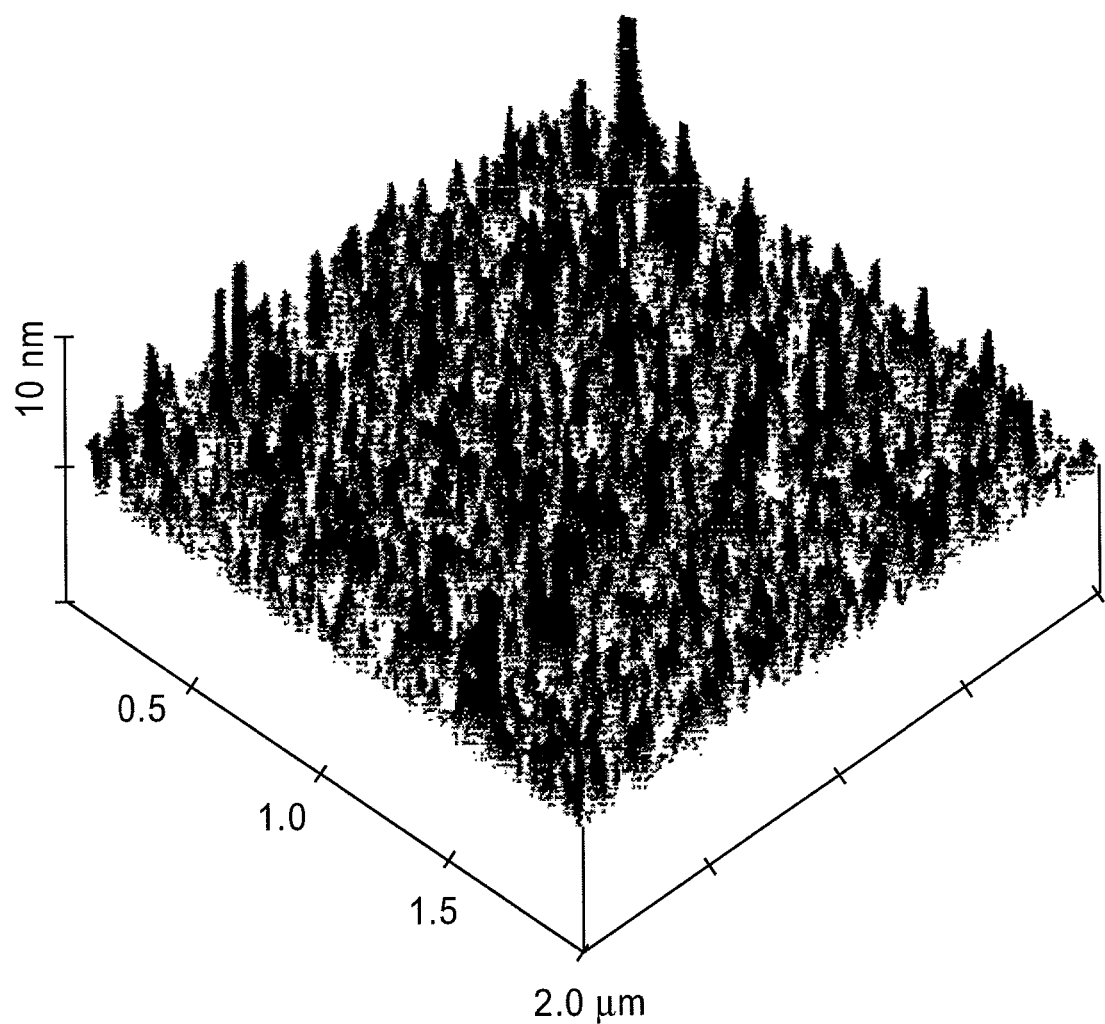
Figure 10C:
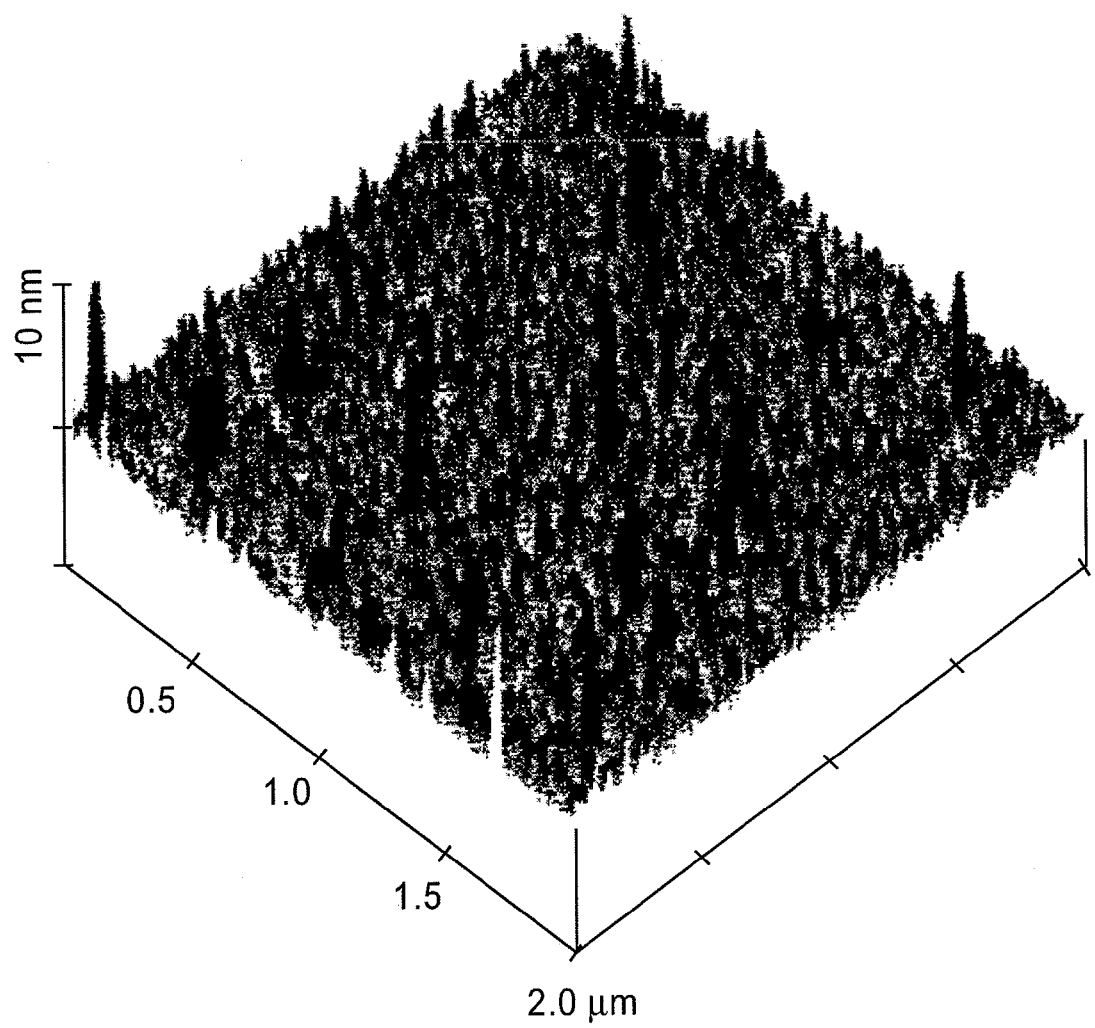

FIGS. 10a-10c illustrate AFM surface images (1×1 μm$^2$) of poly(methacrylic acid) grafted PA-PEI-silicon at [M]$_0$=a) 5%, b) 10% and c) 20% for T=60° C. and t=2 h (hydrogen plasma treatment time=10 s and RF power=40 W) according to embodiments of the invention.

Figure 11A:
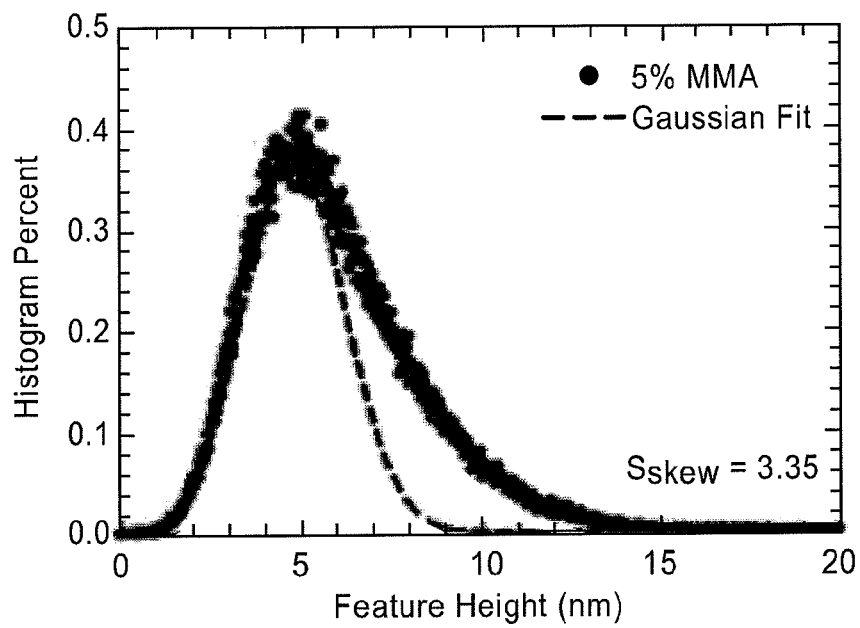
Figure 11B:
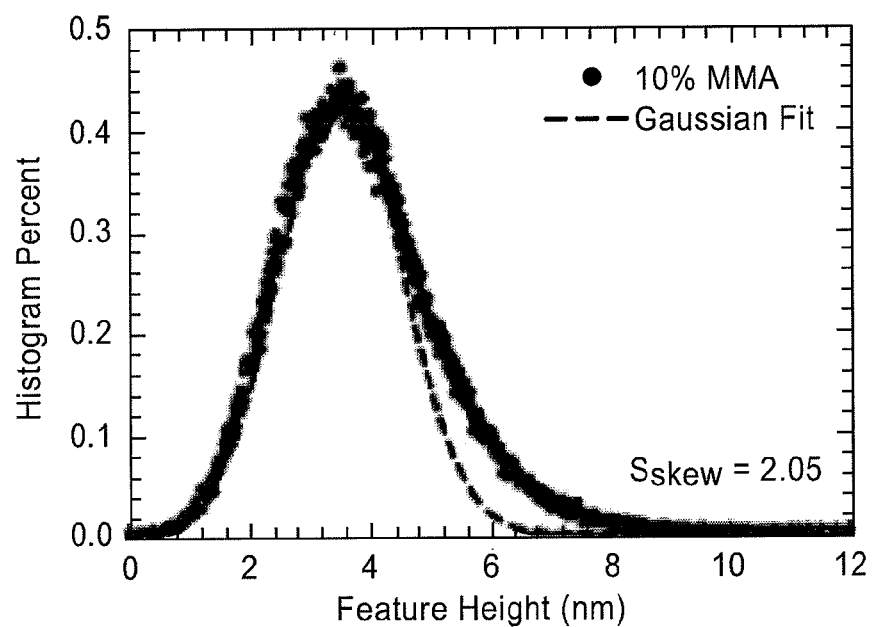
Figure 11C:
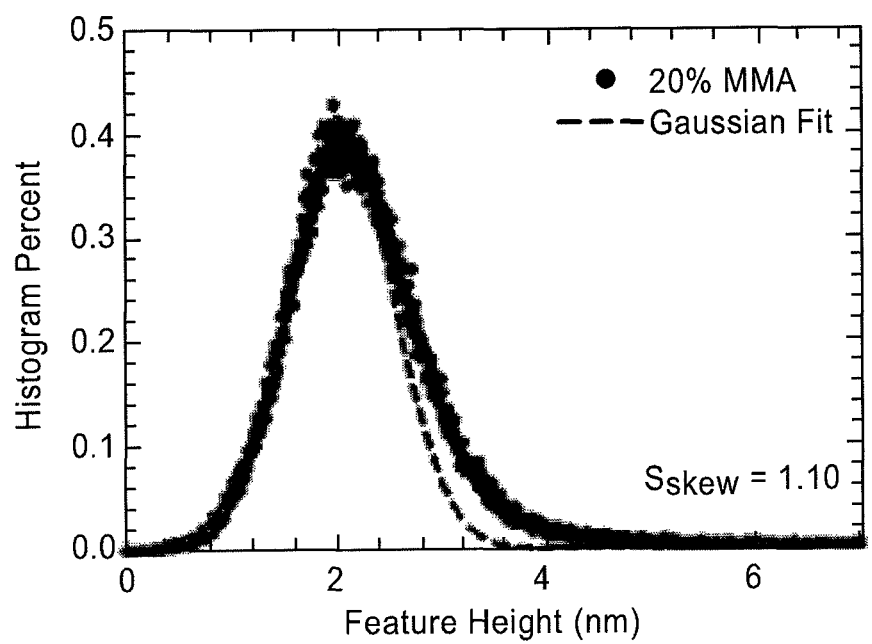

FIGS. 11a-11c illustrate height histogram of poly(methacrylic acid) grafted polyamide at [M]$_0$=a) 5%, b) 10% and c) 20% for T=60° C. and t=2 h (hydrogen plasma treatment time=10 s and RF power=40 W) according to embodiments of the invention.

Figure 12:
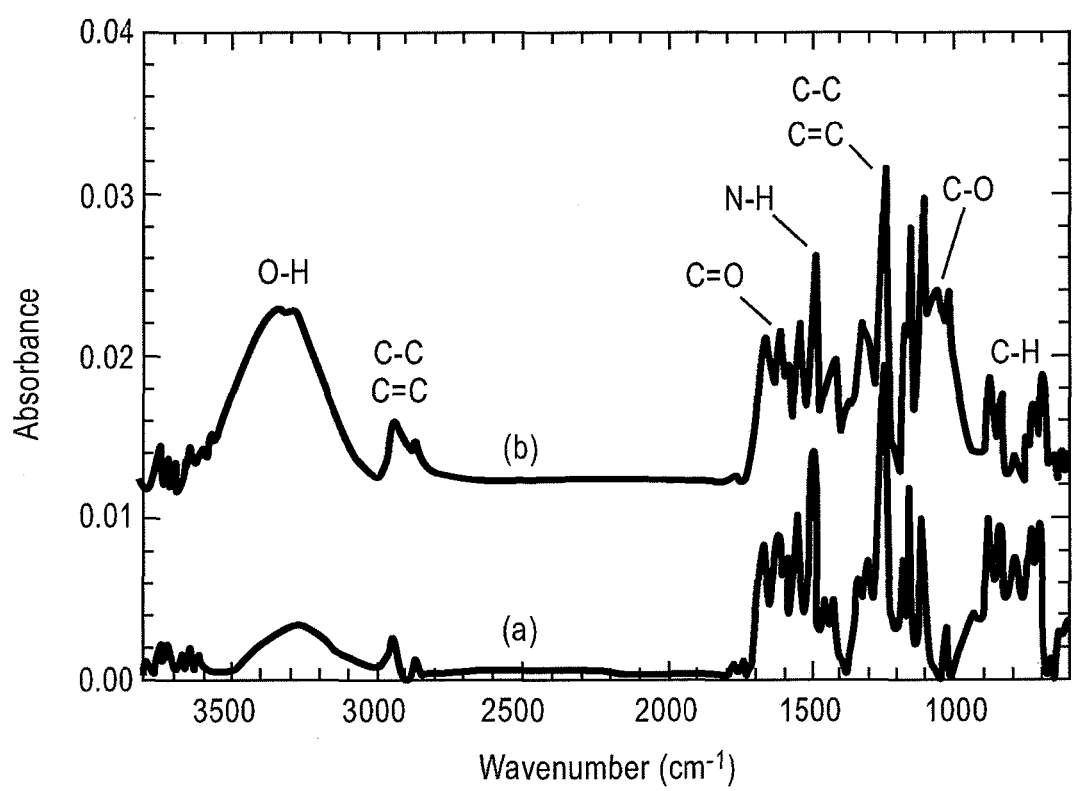

FIG. 12 illustrates ATR-FTIR spectroscopy of polyamide LFC1 RO membranes: a) untreated LFC1 RO membrane and b) LFC1 RO membrane modified by AP hydrogen plasma (treatment time=10 s and RF power=40 W) according to an embodiment of the invention.

Figure 13:
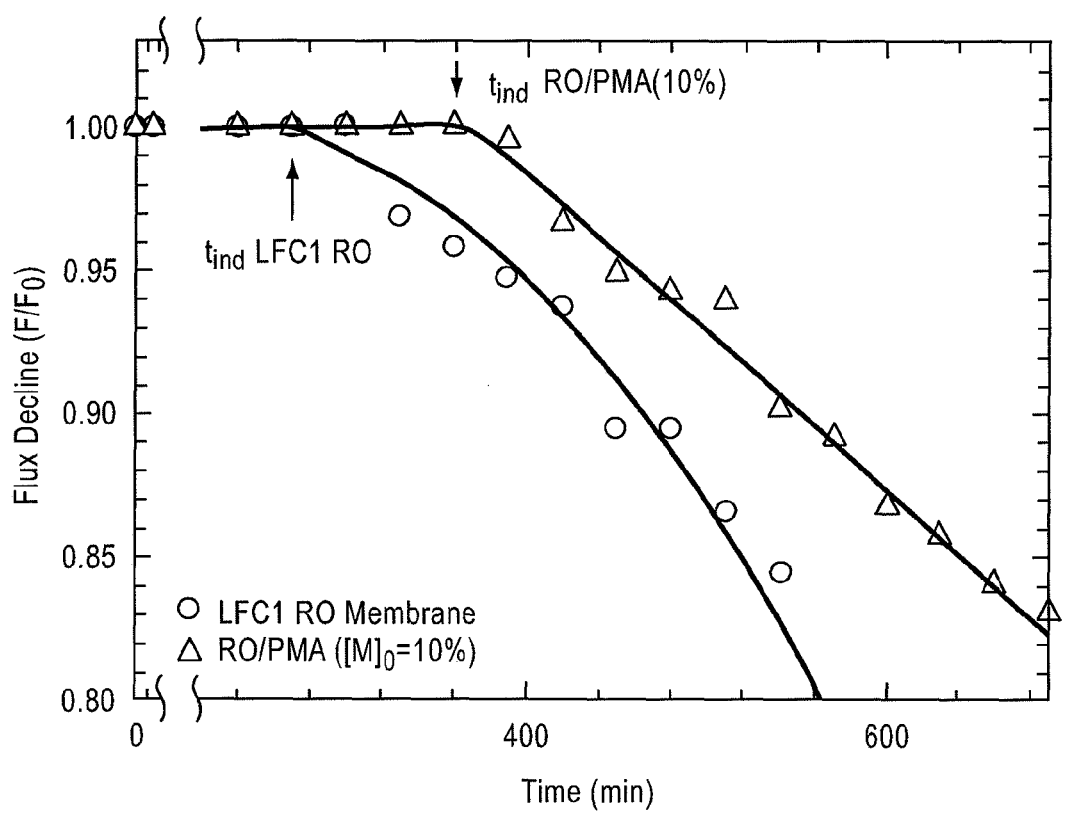
Figure 14A:
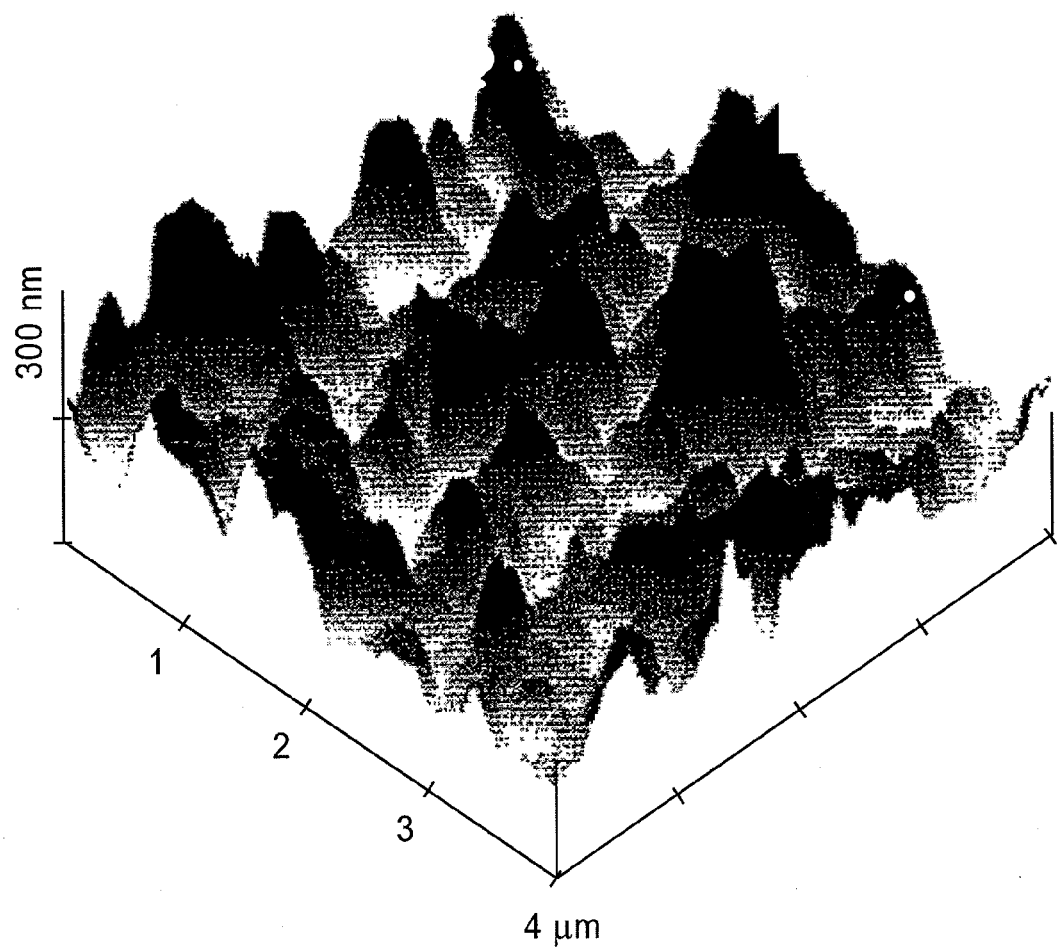
Figure 14B:
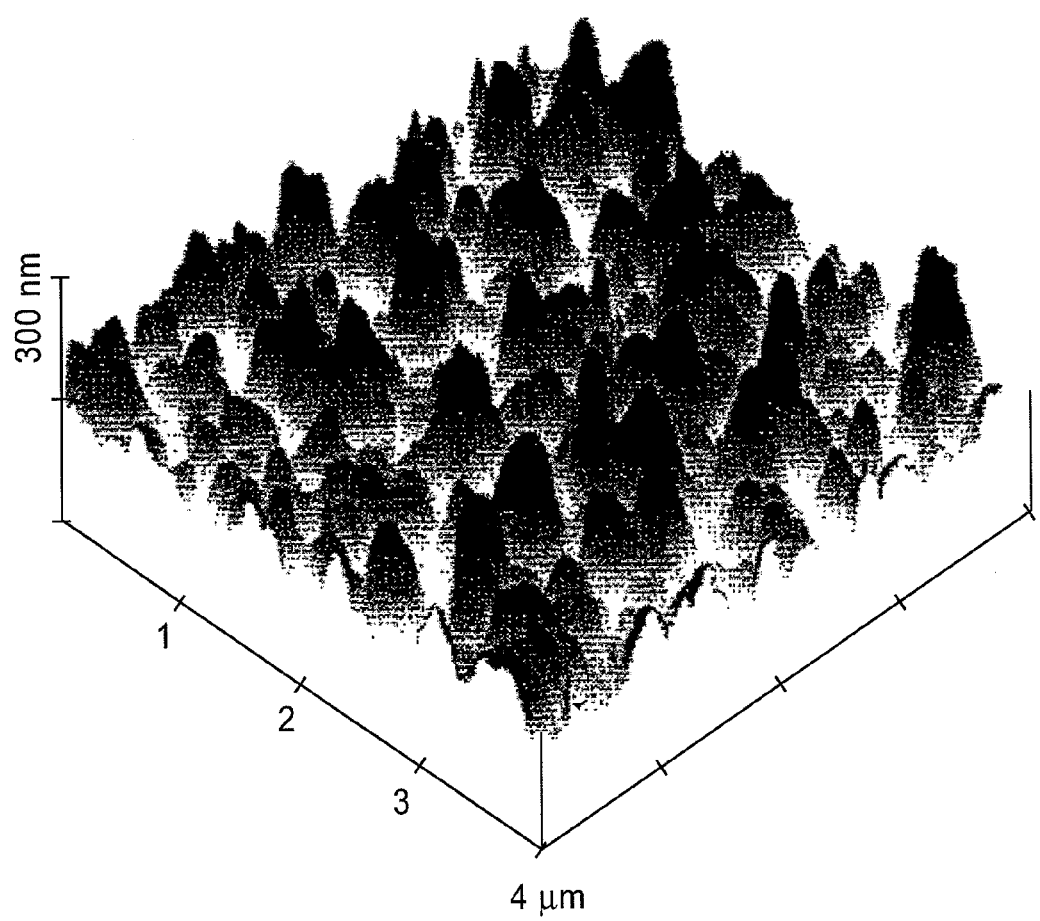
Figure 14C:
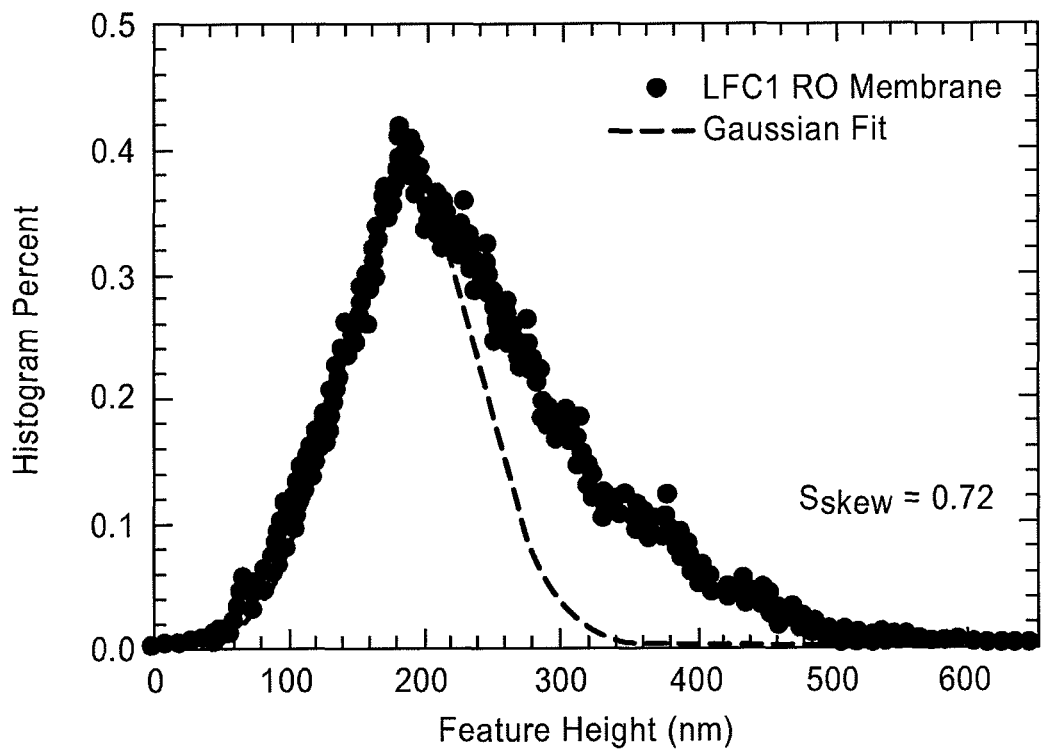
Figure 14D:
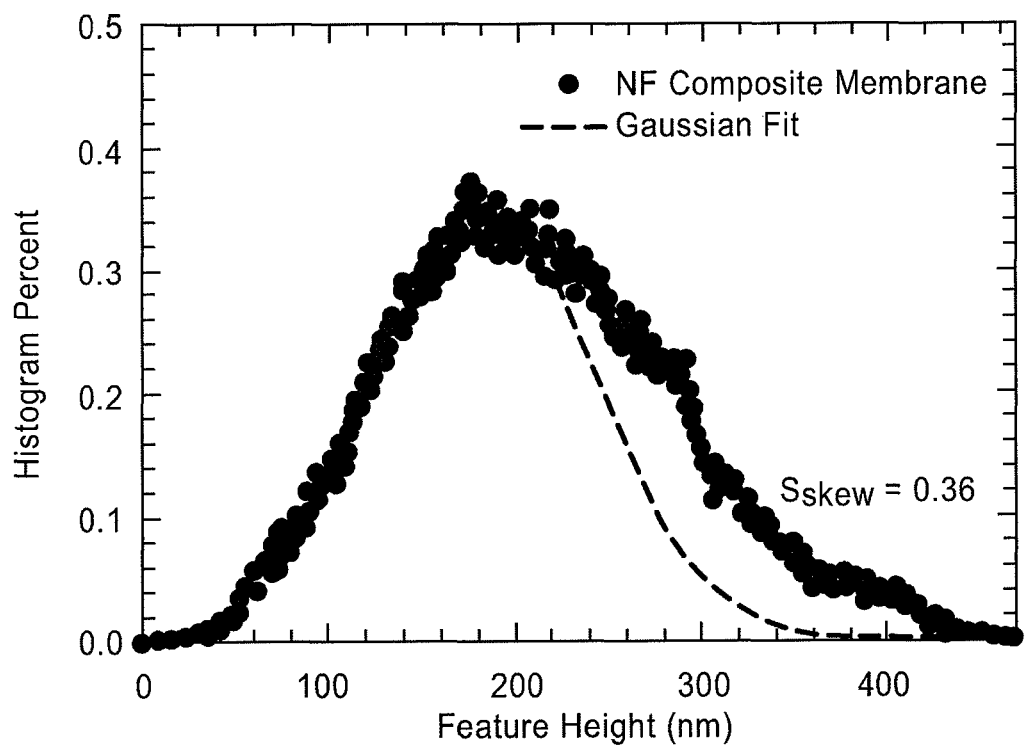

FIG. 13 illustrates permeate flux decline in a gypsum salt solution at SIg=2.0 for an a) LFC1 RO membrane, and an b) LCFl/poly(methyacrylic acid) membrane modified by APPI-FRGP ([M]$_0$=10 vol %, T=60° C., t=30 min) according to an embodiment of the invention.

FIGS. 14a-14d illustrate AFM surface image (1×1 μm$^2$) and feature height histograms of (for a) and c)) an LFC1 RO membrane and (for b) and d)) an NF composite membrane according to embodiments of the invention.

Figure 15:
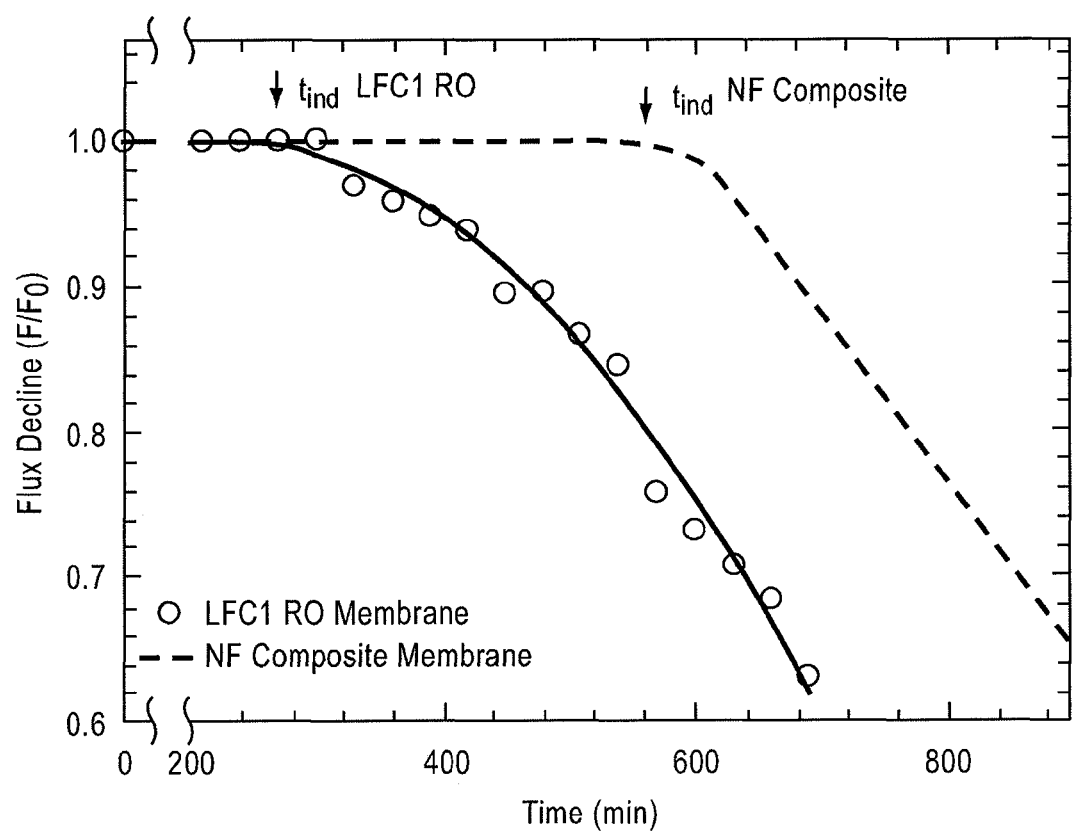

FIG. 15 illustrates flux decline in a gypsum salt solution at SIg=2.0 for an a) unmodified LFC1 RO Membrane and b) unmodified NF composite membrane according to an embodiment of the invention.

Figure 16:
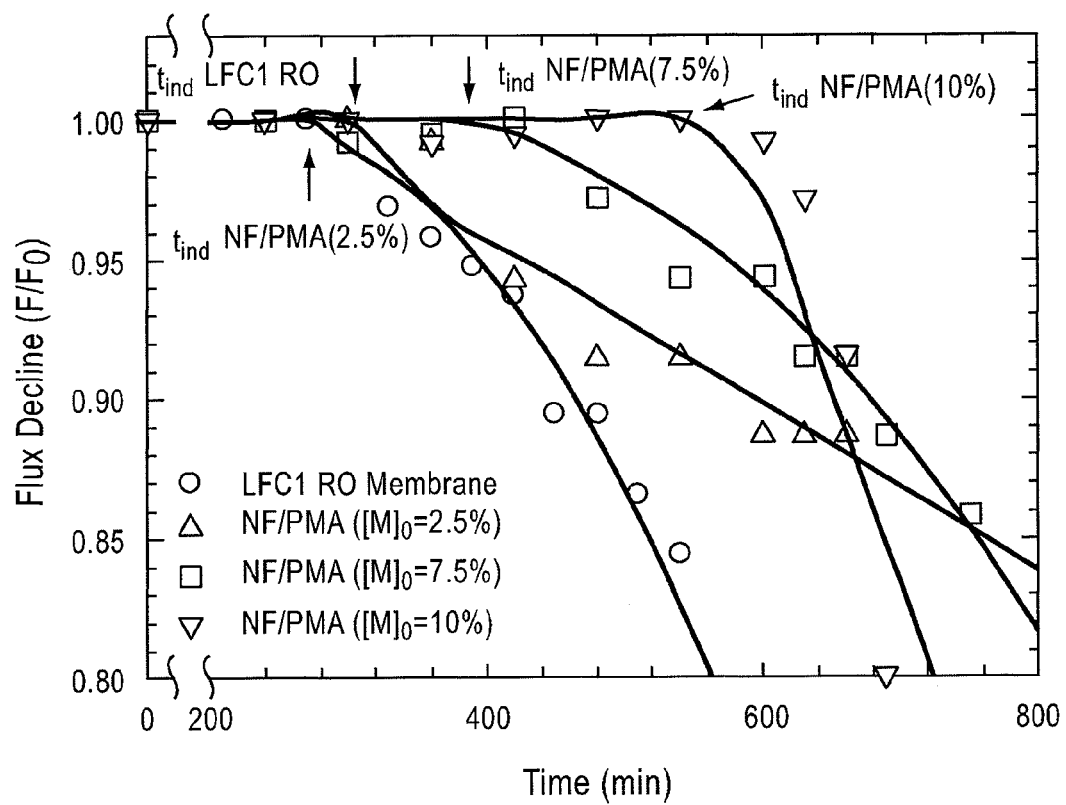

FIG. 16 illustrates flux decline in a gypsum salt solution at SIg=2.0 for an a) LFC1 RO Membrane and an NF composite membrane modified by grafted poly(methacrylic acid) via APPI-FRGP at T=60° C., t=30 min, and [M]$_0$=b) 2.5 vol %, c) 7.5 vol % and d) 10 vol % (treatment time=10 s, RF power=40 W) according to an embodiment of the invention.

Figure 17:
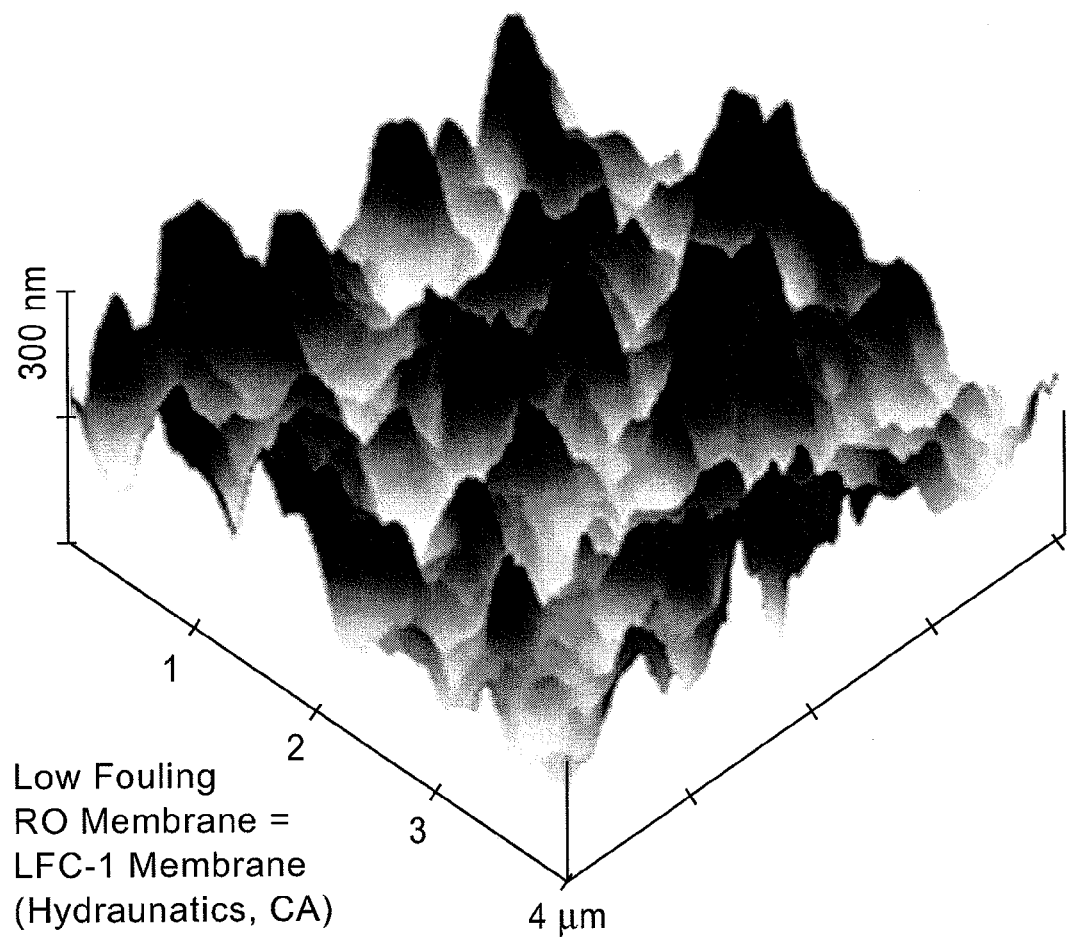

FIG. 17 is an AFM image of a commercially available RO membrane according to an embodiment of the invention.

Figure 18:
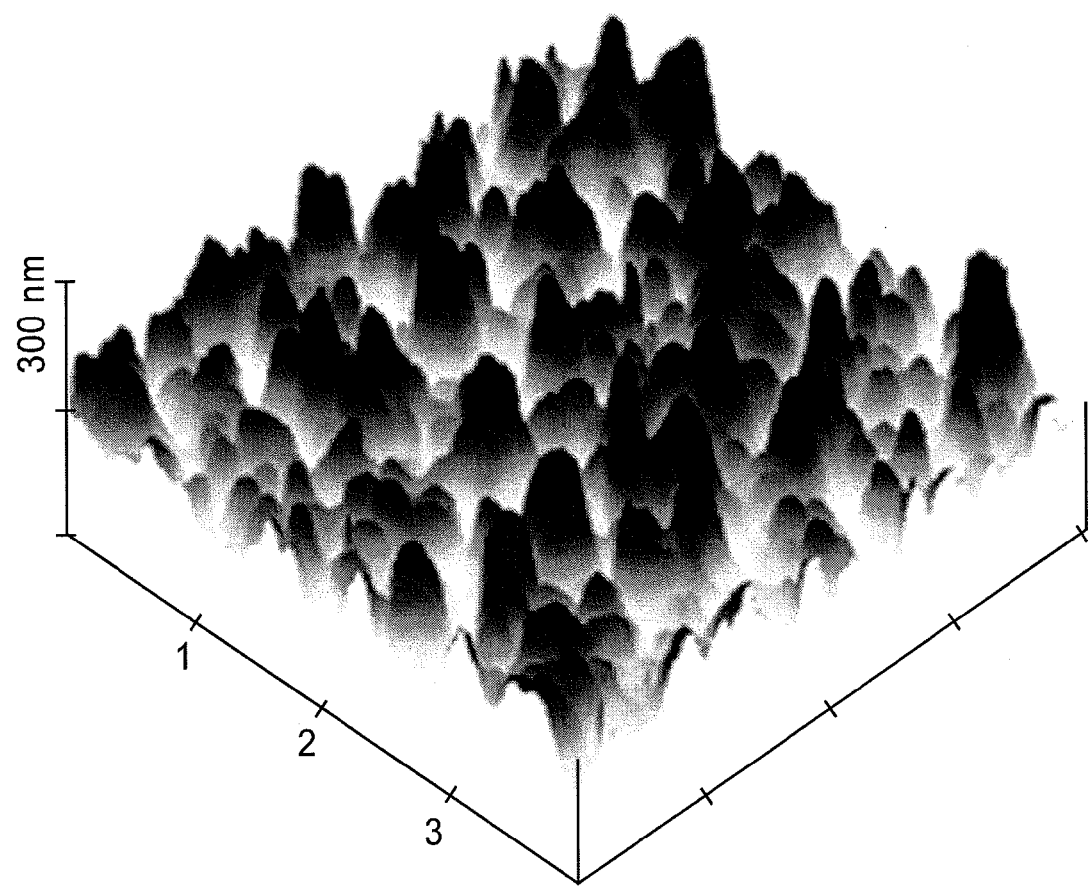

FIG. 18 is an AFM image of a Polysep membrane according to an embodiment of the invention.

Figure 19:
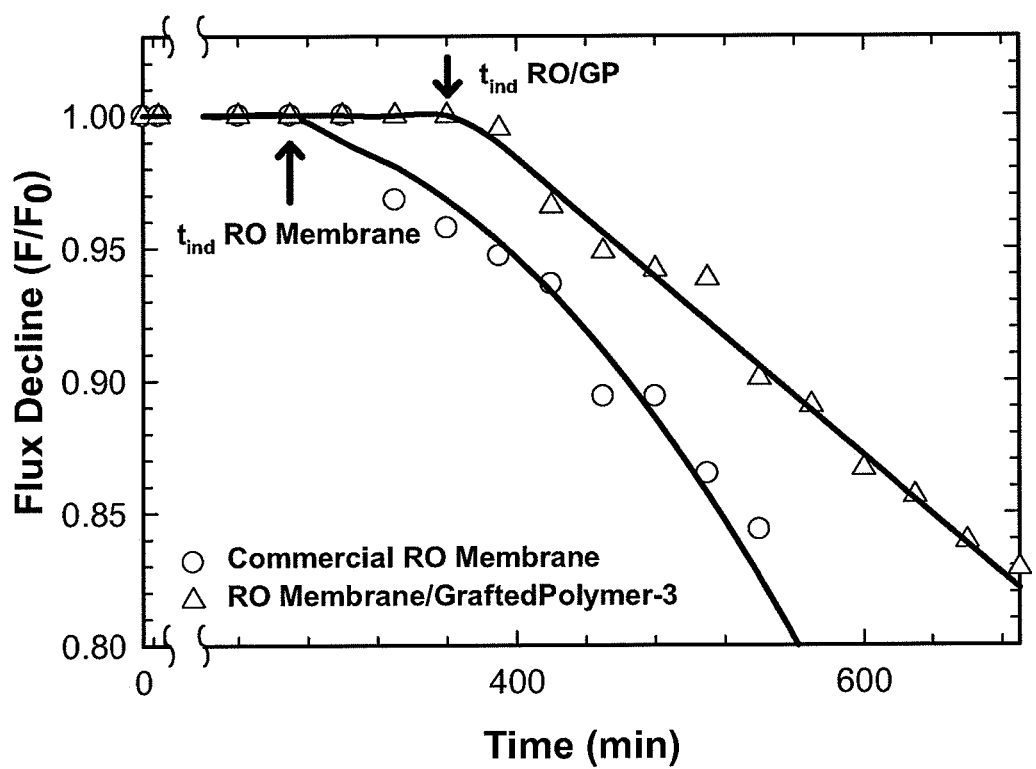
Figure 20:
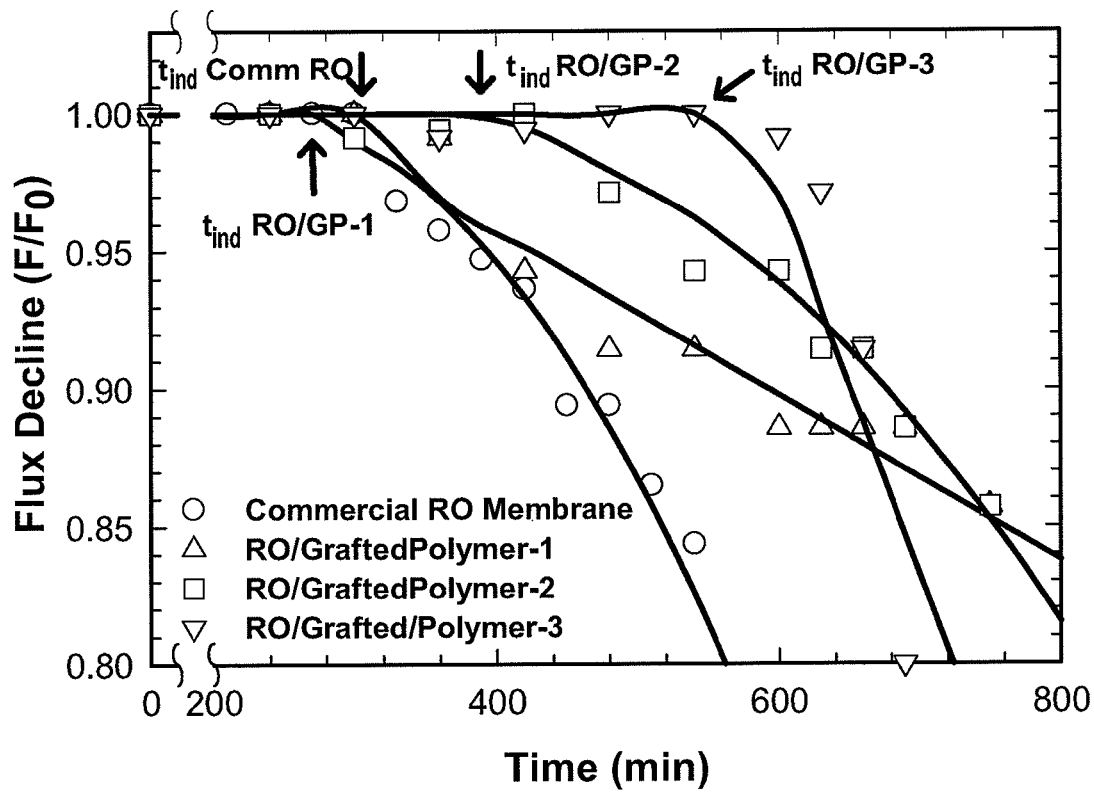

FIGS. 19 and 20 are plots of the flux decline of RO membranes according to embodiments of the invention.

Figure 21:
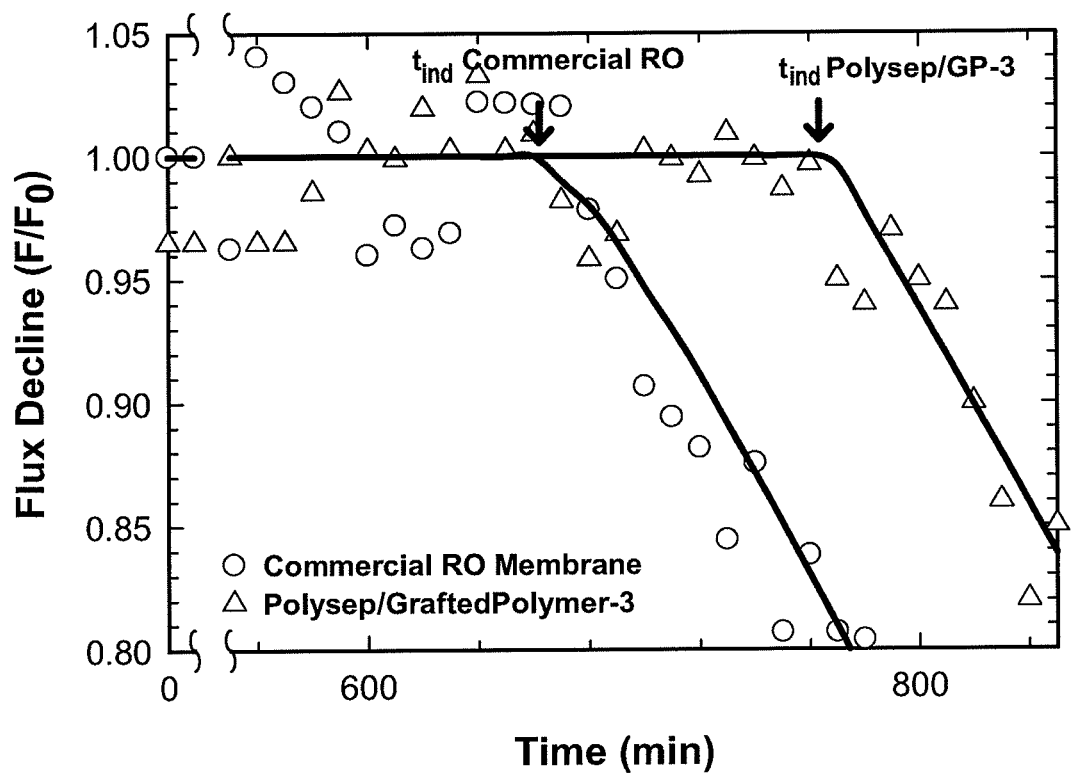

FIG. 21 illustrates the results of a biopolymer membrane fouling study according to an embodiment of the invention.

DETAILED DESCRIPTION

Definitions

The following definitions apply to some of the aspects described with respect to some embodiments of the invention. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the terms "optional" and "optionally" mean that the subsequently described event or circumstance may or may not occur and that the description includes instances where the event or circumstance occurs and instances in which it does not.

Membranes and Process for Formation

Mineral salt scaling, biofouling and colloidal fouling of separation membranes (such as reverse osmosis membranes) cause damage to the membranes, cause permeate flux to decline, and reduce solvent recovery. Embodiments of the invention aim to provide a membrane, for example a membrane that can be used in a reverse osmosis process that resists such scaling and fouling.

Figure 1:
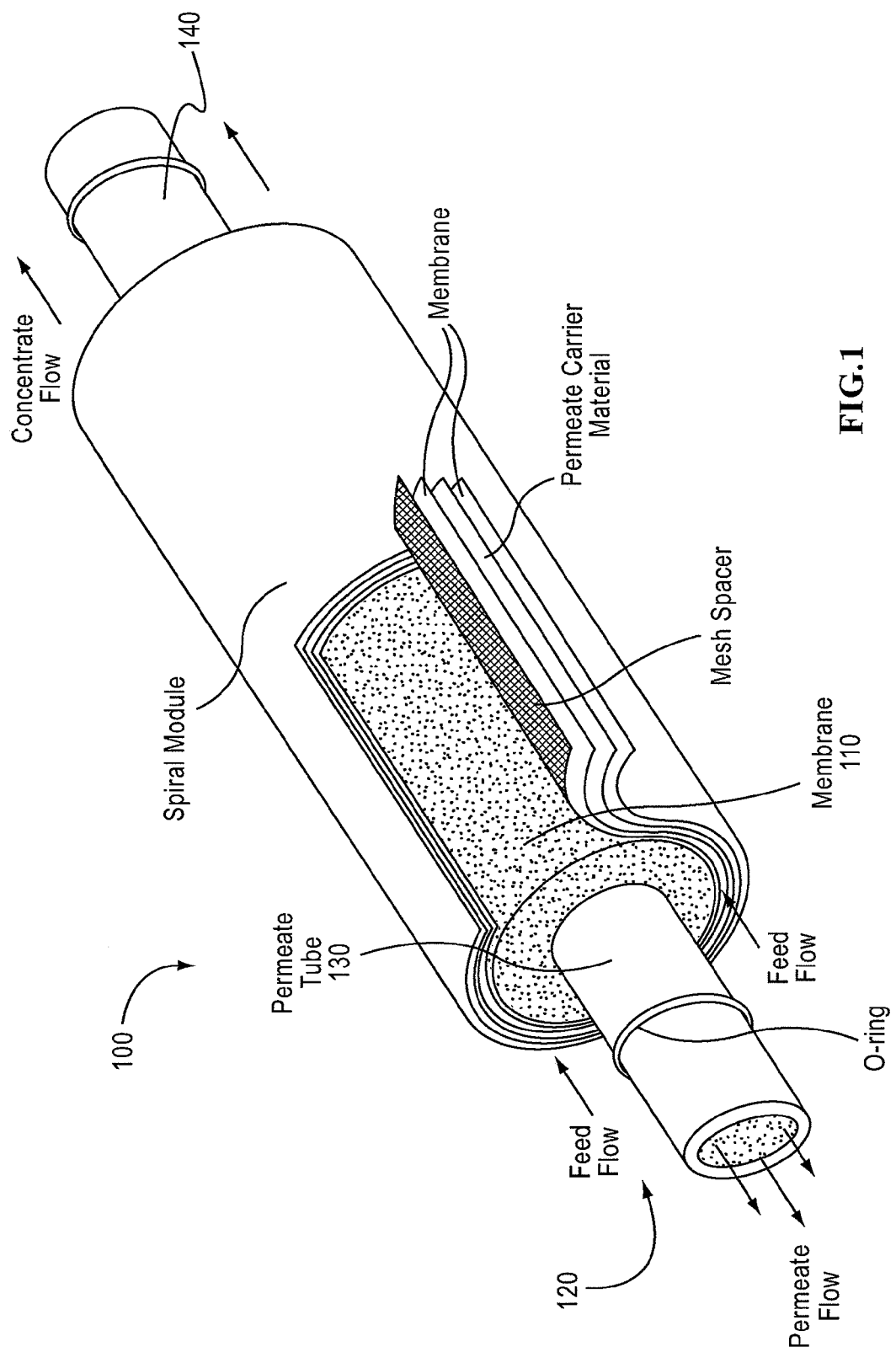
FIG. 1 illustrates a spiral-wound membrane element according to one embodiment of the invention.
Figure 2:
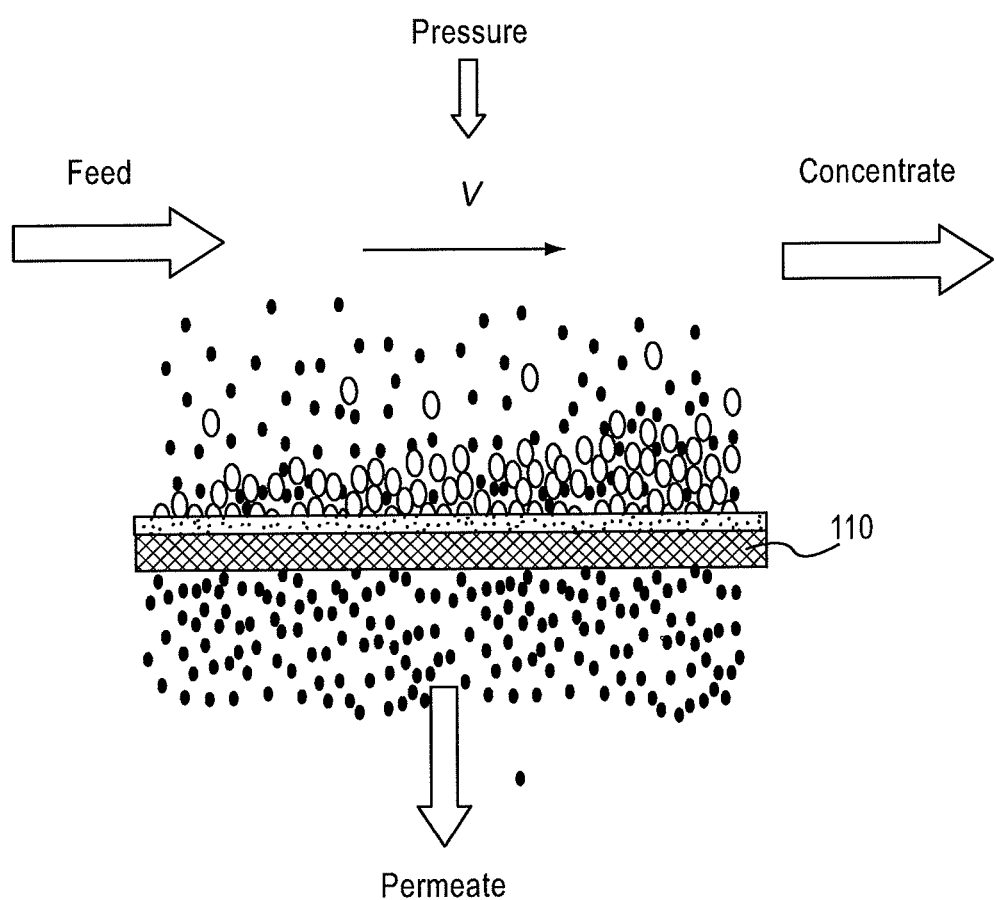
FIG. 2 illustrates a feed stream passing by a membrane according to an embodiment of the invention.
Figure 3:
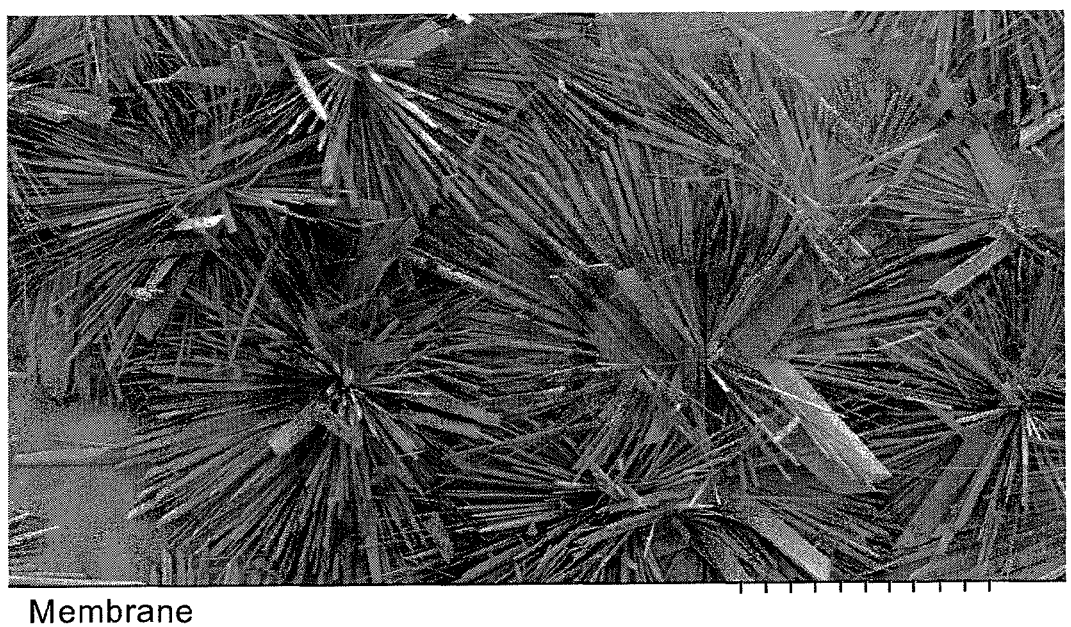
FIG. 3 illustrates crystals on an RO membrane according to an embodiment of the invention.

FIG. 1 illustrates a spiral-wound membrane element 100. The spiral-wound membrane element 100 includes a reverse osmosis (RO) separation membrane 110, a feed stream port or entrance 120, a permeate tube or exit location 140, and a concentrate tube or exit location 150. As illustrated schematically in FIG. 2, the feed stream passes by the membrane 110. The permeate passes through the membrane 110 (for example through pores in the membrane), and mineral salt scale can form on the surface of the membrane 110. As the salt scale forms, less permeate can pass through the RO membrane 110. FIG. 3 illustrates crystals on an RO membrane.

Figure 4:
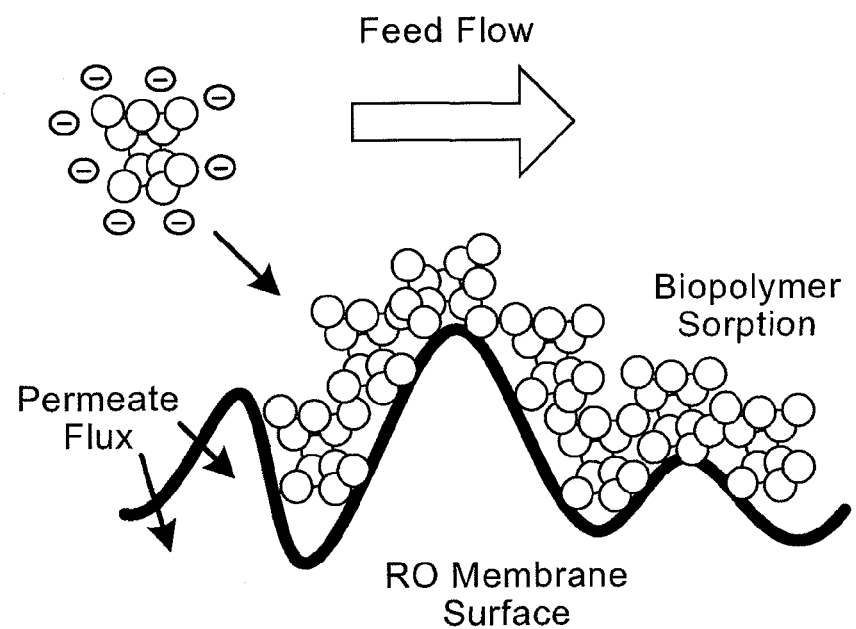
FIG. 4 illustrates biopolymer formation on a membrane surface according to an embodiment of the invention.

FIG. 4 illustrates biopolymer formation on a membrane surface. Some of the embodiments of the invention relate to a novel class of membranes that are capable of resisting organic and biofouling as well as mineral salt scaling, which can be developed based on an atmospheric pressure plasma graft polymerization process to produce a surface layer of covalently and terminally bonded dense phase of polymer chains to a substrate membrane surface. The atmospheric plasma serves as a way of membrane surface initiation, under non-solvent conditions, to produce reactive surface sites of controlled surface density.

Figure 5:
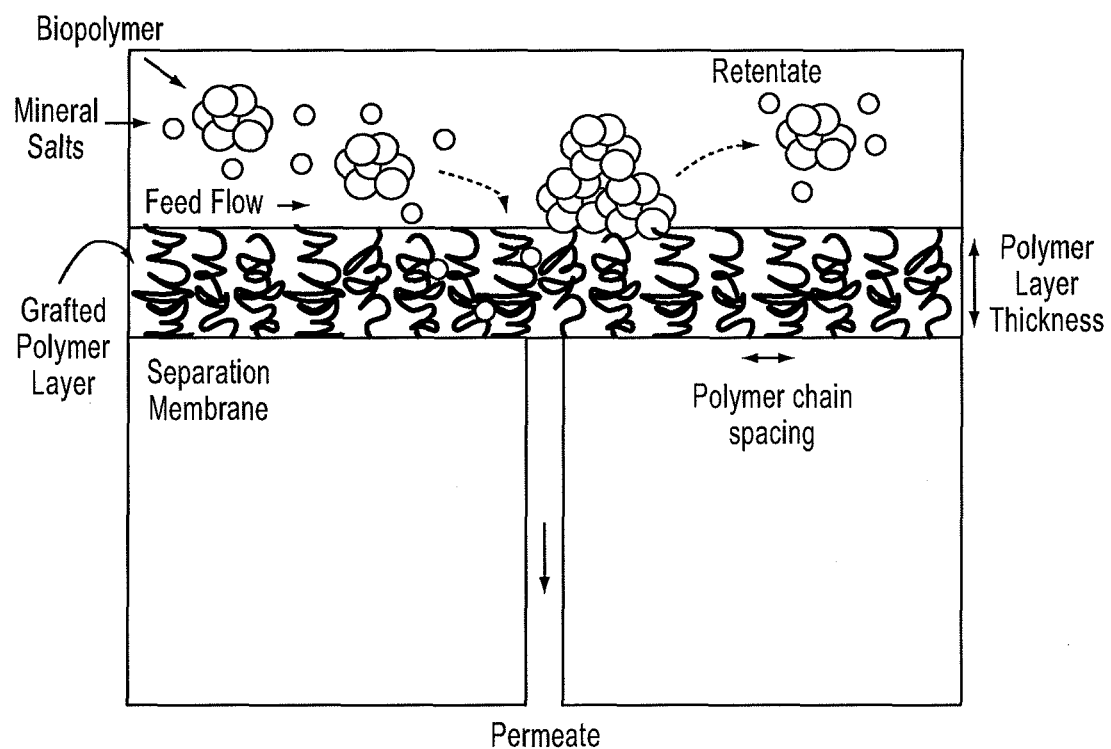
FIG. 5 illustrates an example design for a low-fouling separation membrane according to an embodiment of the invention.

FIG. 5 illustrates an example design for a low-fouling separation membrane. The separation membrane includes a grafted polymer layer that has a particular thickness. As illustrated, the density of the individual polymer chains (or how close the individual polymer chains are to each other) on the surface of the membrane allows the membrane to resist fouling. Specifically as schematically illustrated, the biopolymer foulants and the mineral salt that are in the feed stream pose a low membrane fouling propensity.

In one embodiment, the density of membrane surface initiation sites is tuned by the atmospheric pressure plasma rf power, treatment time, and type of plasma gas. In other embodiments, the density of membrane surface initiation sites is tuned or controlled by one or more of the atmospheric pressure plasma rf power, treatment time, and type of plasma gas.

In one embodiment, the chemical and physical properties of the grafted membrane surface is tuned or controlled by choosing appropriate vinyl monomers and by controlling the rate of membrane surface polymerization by initial monomer concentration, reaction temperature, and reaction time. By tuning the surface activation and graft polymerization conditions, a dense polymer brush layer is created so as to change the membrane surface chemistry and topography with the goal of retarding and/or substantially eliminating membrane surface fouling by proteins or biomaterials, as well as retard nucleation of mineral salts (i.e., scaling) on the surface of membranes.

Figure 6:
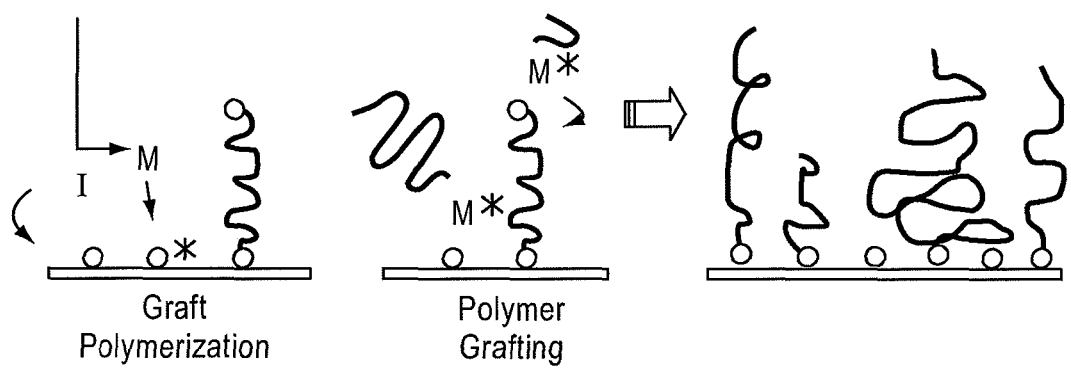
FIGS. 6-7 illustrate graft polymerization processes according to embodiments of the invention.
Figure 7:
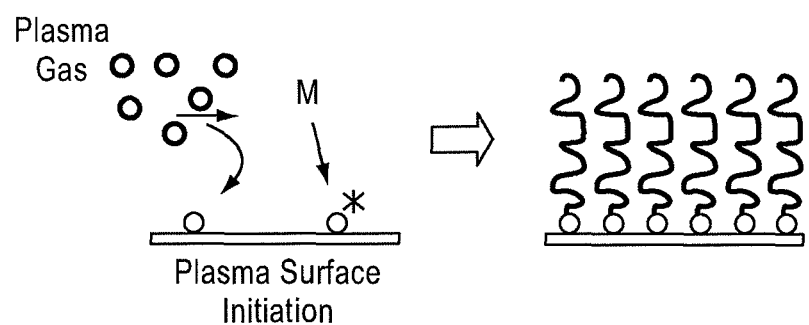

FIGS. 6-7 illustrate a couple of graft polymerization processes. First, schematically illustrated in FIG. 6 is a process for free-radical polymerization. As illustrated, the surface is first activated, and then polymer chains are grafted to the membrane. Schematically illustrated in FIG. 7 is a process for plasma-induced graft polymerization. In some embodiments, the advantages of plasma-induced graft polymerization include a) the polymer is terminally bound directly to the surface of the membrane, b) there is a high surface density, c) there is an increased polymer chain length and uniformity, d) it can be used on organic substrates, and e) it can be performed at or near atmospheric pressure.

In one embodiment, the surface graft polymerization is used to alter the physical properties of the membrane surface such as surface roughness of the material surface the separations properties and permeate flux.

A example of a process for plasma-induced graft polymerization is disclosed in G. Lewis, G. Nowling, R. H. Hicks and Y. Cohen, "Inorganic Surface Nanostructuring by Atmospheric Pressure Plasma-Induced Graft Polymerization," Langmuir, 23, 10756-10764 (2007), the disclosure of which is incorporated herein in its entirety. Another example of a process for plasma-induced graft polymerization is disclosed in WO 2008/060522, entitled "Atmospheric Pressure Plasma-Induced Graft Polymerization," which is incorporated herein in its entirety.

Embodiments of the invention can be used for graft polymerization from a polymeric membrane surface that allows for the formation of surface peroxides, epoxides, or other initiation sites by plasma membrane surface treatment. In one embodiment, the plasma system includes an rf source and a plasma discharge location that is configured to direct the plasma onto the substrate.

Embodiments of the invention can impart permanent (or substantially permanent) physical and chemical properties to substrate materials with the potential for large scale plasma membrane surface treatment at ambient conditions (atmospheric pressure) with graft polymerization. Specifically, the membrane surface is exposed to the $H_2$ plasma which activates sites (surface sites) on the surface of the membrane. In other embodiments, the membrane surface is exposed to different plasma, such as oxygen. The monomers can then couple to the membrane at the surface sites. The plasma process activates a dense array of surface sites, thereby allowing the monomers to couple to the membrane in a dense manner to form a substrate or membrane that has a dense layer of end grafted polymer chains.

In one embodiment, the plasma impinges the surface of the RO membrane. The results would be the reduction in membrane surface fouling and/or mineral salt scaling on the membrane, and therefore, an increase in the lifetime of the membrane.

Some embodiments can be carried out in the liquid phase, so as to allow polymers to be graft polymerized onto a surface. In some embodiments, the polymer surface layer has a thickness that exceeds a monomer molecular layer thickness.

EXAMPLE

Surface Structuring of Reverse Osmosis Membranes

Mineral salt scaling of polyamide reverse osmosis (RO) membranes is a major impediment to achieving high product water recovery when desalting brackish water. Mineral salt scaling occurs when mineral salts concentrate near the membrane surface, leading to supersaturation and crystallization at the membrane-solution interface. Surface scaling results in both permeate flux decline and potential membrane damage. Biofouling and colloidal fouling of the membranes also occur and also result in membrane damage, permeate flux decline, and reduced product water recovery.

Surface graft polymerization of RO membranes has been used to retard biofouling via modification of the native substrate surface chemistry and morphology to reduce protein adhesion. The end-grafted polymer chains have significant mobility when exposed to a good solvent, preventing foulants from adhering to the RO membrane surface. Also, sorption of organic or inorganic foulants may be controlled by engineering the RO membrane surface chemistry. This strategy has been adopted, in the present disclosure, to reduce mineral salt surface sealing via nanostructuring RO membranes by atmospheric pressure plasma-induced free-radical graft polymerization (APPI-FRGP).

Structured surfaces, composed of a highly dense, end-grafted polymer layer, will prevent both mineral salt surface nucleation and surface adhesion of crystals formed in the bulk solution. Also, the water soluble polymer grafted layer would be beneficial to maintain the high water permeability of the RO membrane. The monomer chosen for this study, methacrylic acid, is of interest because poly(methacrylic acid) is a water-soluble polymer that has been proposed as a surface modifier to reduce membrane fouling. Moreover, this monomer would enable one to impart a negative surface charge to the membrane, thereby reducing colloidal fouling associated with the majority of natural colloidal matter which is typically negatively charged. Accordingly, RO membranes have been nanostructured by grafted poly(methacrylic acid) layers to explore the impact of the surface nanostructured membranes on mineral salt scaling propensity.

Prime-grade silicon <100> wafers, used as substrates for surrogate polyamide-poly(ethyleneimine) thin films, were purchased from Wafernet, Inc. (San Jose, Calif.). Reagent grade sulfuric acid and aqueous hydrogen peroxide (30 vol %), used for silicon wafer cleaning, was purchased from Fisher Scientific (Pittsburgh, Pa.). Poly(ethyleneimine) (PEI, $M_w$=750,000 g/mol), used to promote adhesion between the polyamide layer and silicon wafers, and 1,3-Phenylenediamine (MPDA, $\geq$99%) and 1,3,5-benzenetricarboxylic chloride (TMC, 98%), which are monomers used for polyamide interfacial polymerization, were purchased from Sigma Aldrich (St. Louis, Mo.). Methacrylic acid monomer ($\geq$98%), used for graft polymerization, was used as received and was obtained from Fluka (Ronkonkoma, N.Y.). Ultra-pure deionized water, used as the solvent for aqueous-phase graft polymerization and membrane surface scaling studies, was produced by filtering distilled water through a Milli-Q filtration system (Millipore Corp., San Jose, Calif.). Diagnostic membrane scaling tests were performed on a nanofiltration (NF) and reverse osmosis (RO) membranes. The RO membrane was created by polyamide interfacial polymerization on a commercial polysulfone-polyester support (Hydranautics, Oceanside, Calif.). The RO membrane was obtained from a commercial source (LFC1, Hydranautics). Calcium chloride ($CaCl_2$—$2H_2O$), anhydrous sodium sulfate ($Na_2SO_4$), and sodium chloride (NaCl), which were used in mineral salt scaling test solutions and salt rejection studies, were reagent grade chemicals purchased from Fisher Scientific (Pittsburgh, Pa.).

In one embodiment, the characteristics of the grafted polymer layer were determined on a surrogate polyamide surface. This surface was prepared as a polyamide-polyethyleneimine-silicon (PA-PEI-silicon) by creating a thin PA layer on a PEI-silicon substrate using interfacial polymerization process which is used for creating commercial RO membranes. Silicon surfaces (1×1 cm$^2$) were cleaned in an acid-etching process in a piranha solution (70% sulfuric acid, 30% hydrogen peroxide) for 10 min at 90° C. and then triple rinsed to remove residuals and oven dried. About 1 mL of a 0.3 wt % aqueous solution of PEI, used to assist in adhesion of PA to the silicon, was initially spin-coated on the cleaned silicon surface at 2500 RPM for 25 sec using a spin-coater (model PWM32, Headway Research Inc., Garland, Tex.) in an inert nitrogen environment. About 1 mL of a 2.5 wt % aqueous solution of MPDA was then applied by spin-coating onto the PEI-silicon surface at 2500 RPM for 25 sec. Once the formation of the MPDA-PEI-silicon surface was complete, a syringe was used to dispense approximately 1 mL of a 0.13 wt % TMC/Naptha solution to initiate interfacial polymerization at room temperature. The reaction was allowed to proceed for approximately 5 min, at which time the surfaces were washed in deionized (DI) water to remove unreacted monomer, and the PA-PEI-silicon surface was oven dried.

The PA-PEI-silicon substrates, the LFC1 membrane, and the RO composite membrane were surface structured. Briefly, atmospheric pressure plasma source was used to treat the PA-PEI-silicon, LFC1, and NF membranes for a treatment period of 5-40 s at an RF Power of 10-60 W. A mixture of 1 vol % of ultra-high purity hydrogen (99.999%) in helium (99.999%) was delivered to the AP plasma source at a total flow rate of about 30 L/min. Following plasma surface treatment, the substrates were exposed to ultra high purity oxygen at a flow rate of about 50 L/min for a period of 2 minutes to allow for the formation of peroxides from surface radicals. The hydrogen plasma treated substrates were graft polymerized in an aqueous solution of methacrylic acid with an initial monomer concentration range of $[M]0=5$ to 20 vol % at $T=60°$ C. and 70° C. Following the reaction, the substrates were washed in DI water to remove surface adsorbed homopolymer and oven dried.

Surface structuring of the PA-PEI-silicon surfaces was studied. Briefly, surface chemistry was confirmed by Attenuated Total Reflectance Fourier Transform Infrared (ATR-FTIR) spectroscopy using a BioRad FTS-40 FTIR. The thickness of the grafted layer on the PA-PEI-silicon wafers was determined by a Spectroscopic Ellipsometer. Contact angle of the structured surface was measured by using the sessile-drop method with a Kruss Model G-23 contact angle instrument in DI water at 22° C./40-50% R.H. Surface feature analysis and morphology characterization was achieved via tapping-mode atomic force microscopy.

Mineral salt scaling studies were conducted using a stainless steel, disk-type membrane cell (xx4404700, Millipore, Corp.) with an 11.3 cm² effective filtration area (See FIG. 12) (cell radius=19 mm; cell thickness=2.7 cm). A constant flow of a mineral salt solution was delivered to the membrane cell at a flow rate of 132 mL/min (cross-flow velocity=0.19 cm/s) by a single head piston pump (590, Waters, Milford, Mass.) from a magnetically stirred 600 mL feed storage tank. A refrigerated recirculator (model 625, Fisher Scientific, Pittsburgh, Pa.) served to maintain a constant reservoir temperature at about 25° C. A back-pressure regulator was used to adjust the transmembrane pressure in the cell, and pressure fluctuations were reduced by using a pressure dampener. The feed flow rate, cross-flow velocity and solvent flux through the membrane were controlled by adjusting the gate valves and measured using a flow meter (Cole-Parmer, Vernon Hills, Ill.) and digital pressure gauge (Achcroft, Milford, Conn.), respectively. Scaling tests were conducted in a total recycle mode, whereby the retentate was passed through a 0.2 μm sterilized microfilter capsule filter (Gelman Sciences, Ann Arbor, Mich.) to remove crystals that form in the bulk solution. Permeate flux was measured by collecting and measuring the filtrate weight with time using electronic balance (model ALC3100.2, Acculab, Arvada, Colo.). The electronic balance included a load cell that interfaced with a computer for data record keeping purposes.

Figure 8:
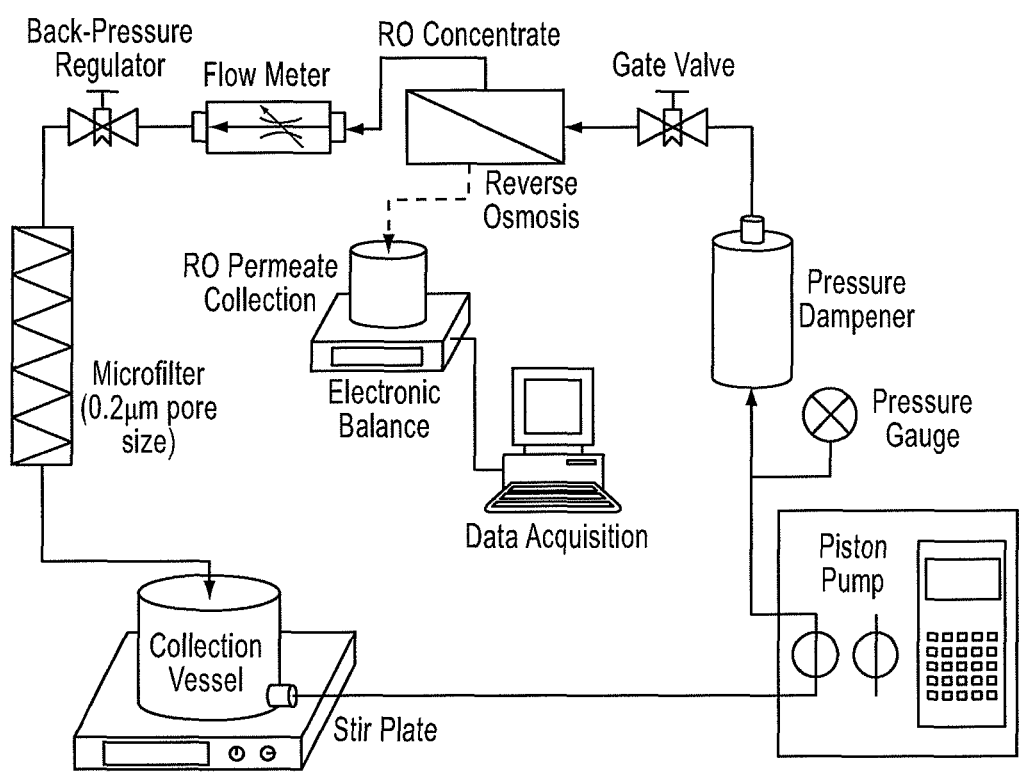
FIG. 8 illustrates a reverse osmosis membrane scaling test system according to an embodiment of the invention.

Isothermal constant flow salt rejection and surface scaling studies were conducted using a commercial LFC1 RO membrane, an NF membrane, and RO and NF membranes surface structured by grafted poly(methacrylic acid). Prior to each scaling experiment, the membranes were equilibrated in the RO cell (as illustrated in FIG. 8) by recirculating DI water through the system at a feed flow rate of 132 mL/min and transmembrane pressure of 300 psi for 5 h. Membrane equilibration was followed by conditioning with the addition of the model solution at $SI_g=2$ ($[CaCl_2]=5.234$ g/l and $[Na_2SO_4]=5.056$ g/l) for an additional 1 at the same membrane operating conditions to establish a baseline for permeate flux. A saturation index (SI) of $SI_g=2$ was chosen to enhance surface crystallization in order to study mineral salt surface crystal formation over a reasonably short experimentation period. Once a permeate flux baseline had been established, the membrane-scaling studies were carried out at the same cross-flow velocity (about 0.19 cm/s), which was set by adjusting the transmembrane pressure. The retentate stream was recirculated continuously in a total recycle mode to maintain a constant feed concentration. Salt rejection studies were carried out using a similar procedure of membrane equilibration and conditioning. Membrane performance was measured by evaluating NaCl salt rejection at a feed concentration of 1000 ppm NaCl for the modified and unmodified membranes.

Poly(methacrylic acid) (PMA) was chemically grafted to PA-PEI-silicon surrogate surfaces using a two-step atmospheric pressure (AP) plasma-induced graft polymerization approach combining surface activation by hydrogen plasma surface treatment with methacrylic acid graft polymerization by monomer addition to activated surface sites. PA-PEI-silicon surrogate surfaces were created to replicate the surface chemistry of a commercial RO membrane, while maintaining a low surface roughness polymer layer, which would allow one to characterize the impact of surface graft polymerization on the surface topography. The PA polymer layer was characterized by a spatially homogeneous polymer surface coverage, as noted in the AFM images. The PA-PEI polymer layer thickness was about 1.3 to 1.5 nm and the surface roughness of the PA-PEI-silicon substrate ($R_{rms}=0.61$ nm) increased almost 3-fold, relative to the native silicon surface ($R_{rms}-0.21$ nm). The feature height distribution exhibited a near-Gaussian distribution, with a small histogram tail, due to the presence of larger feature heights in the range of 2 nm to 3 nm ($S_{skew}=0.51$). The low surface roughness of the surrogate polyamide polymer layer used to replicate the RO membrane surface chemistry was well-suited for studying surface structuring by APPI-FRGP.

The plasma operating parameters, such as treatment time and RF power, were studied to determine the impact of AP plasma surface activation on surface graft polymerization of PA-PEI-silicon substrates. The effect of plasma treatment time on graft polymerization was studied by measuring the surface density and chain size of grafted poly(methacrylic acid) via the surface roughness, polymer volume, polymer layer thickness and the peak density of the polymer structured surfaces.

In some embodiments the polymer volume (of the set of polymers disposed on the substrate) is about 4000 nm³/μm². In other embodiments the polymer volume is between about 4000 nm³/μm² and about 8000 nm³/μm². In other embodiments the polymer volume is between about 3000 nm³/μm² and about 9000 nm³/μm². In further embodiments the polymer volume is between about 3500 nm³/μm² and about 4500 nm³/μm². Table 2 shows the surface roughness, water contact angle, polymer volume and peak density for APPI-FRGP of PA-PEI-silicon substrates ($[M]0=10$ vol %, $T=60°$ C., reaction time=2 hours) for some embodiments of the invention.

TABLE 2

| $H_2$ Plasma Treatment Time (s)[a] | Water Contact Angle (deg)[a] | $R_{rms}$ (nm)[c] | Polymer Vol $(nm^3/\mu m^2)$ $(10^3)$[c] | Peak Number Density (features/$\mu m^2$)[c] |
|---|---|---|---|---|
| 5  | 28 | 1.19 | 3.904 | 320 |
| 10 | 13 | 1.50 | 4.344 | 463 |
| 20 | 15 | 1.36 | 4.092 | 352 |
| 30 | 15 | 1.04 | 3.520 | 279 |
| 40 | 14 | 1.12 | 3.734 | 295 |

[a]APPI-FRGP conducted at RF power = 40 W.
[b]Water contact angle (native polyamide CA = 34°)
[c]Polymer volume and peak density calculated by atomic force microscopy ($[M]_0 = 10$ vol % at 60° C. for t = 2 h).

From previous studies of APPI-FRGP on inorganic silicon substrates, a maximum in the surface density of plasma activated surface sites was observed for a 10 s plasma treatment time. Similarly, for APPI-FRGP of PA-PEI-silicon substrates, a maximum in the surface roughness, polymer volume and polymer feature peak number density for grafted poly(methacrylic acid) was noted (See Table 2) for a 10 s plasma surface treatment time (RF power=40 W). When the plasma treatment time was increased from 5 to 10 s, about a 45%, 26%, and 11% increase was observed in polymer peak density, surface roughness, and polymer volume, respectively (See Table 2). Also, the water contact angle decreased by more than 60% for a plasma treatment time of 10 s (CA=13°), compared to the native PA-PEI-silicon surface (CA=34°). However, for plasma treatment time intervals of 20 s and 30 s, a 24% and 39% decrease the polymer peak number density was noted, relative to a 10 s plasma treatment time (See Table 2). A 5.8% and 18.9% decrease in polymer volume and 9.3% and 30.7% decrease in surface roughness was also observed when the plasma treatment time was increased to 20 and 30 s, respectively, relative to a 10 s plasma treatment time. These findings suggest that the optimal hydrogen plasma surface activation time interval is similar for inorganic silicon and organic PA surfaces. However, it is noted that in the current study, less than a 5% change in surface roughness and peak number density was observed when the RF power was varied between 20 W to 60 W. It is plausible that the less than 5% change polymer surface density with plasma RF power may be due to the higher reactivity of the organic surface. The RF power is a factor that affects the concentration of plasma species formed in the gas. Therefore, it is likely that surface functional groups with lower bond energies (i.e., organic/polymeric surface), would involve a lower concentration of plasma species (and lower exposure time) to activate a surface and form peroxide activation sites, compared to surfaces composed of functional groups with higher bond energies (i.e., inorganic surfaces).

Figure 9:
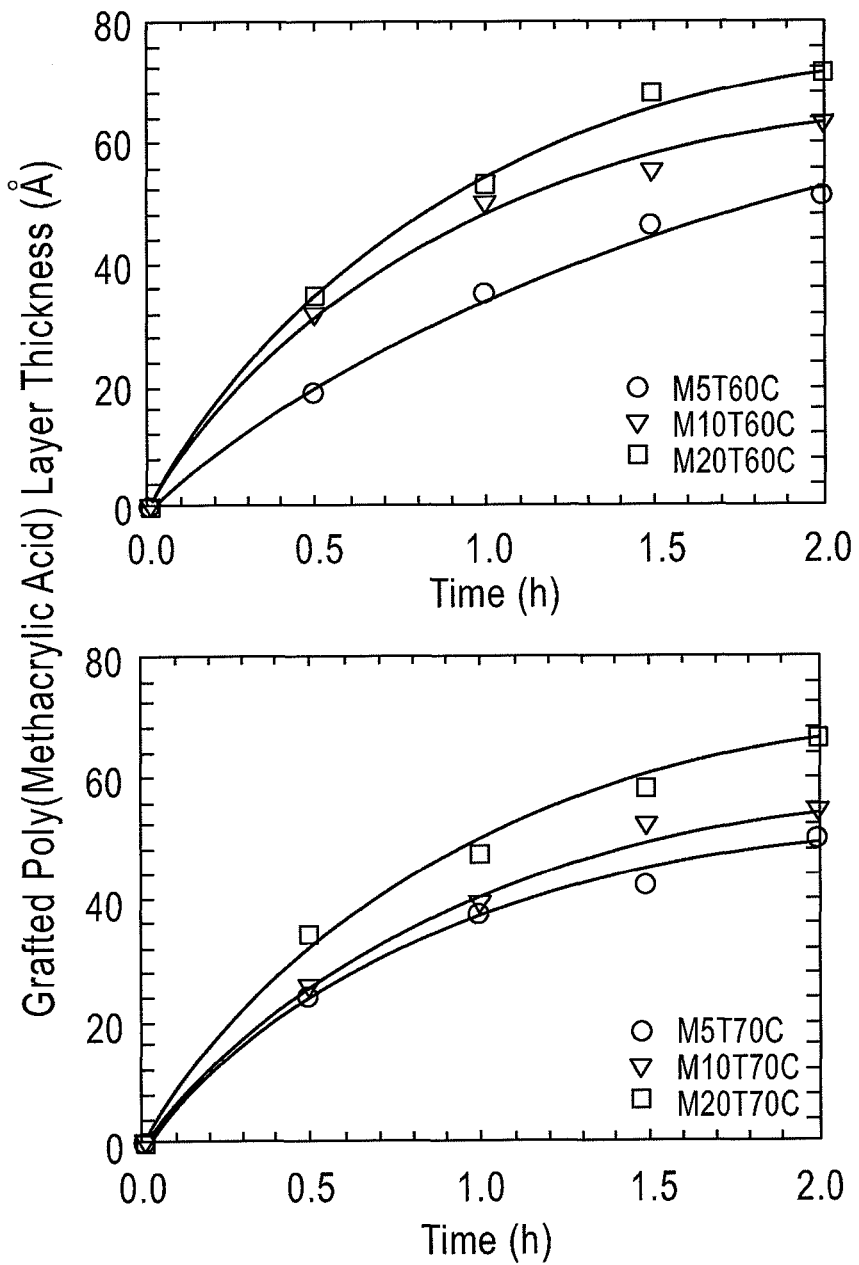

The grafted poly(methacrylic acid) film growth (i.e., evolution of film thickness) for APPI-FRGP on surrogate PA-PEI-silicon substrates (See FIG. 9) approached a plateau with respect to time for initial monomer concentrations ($[M]_0$ in the range of 5 to 20 vol % at 60° C. and 70° C. reaction temperatures. The polymer layer achieved by APPI-FRGP of methacrylic acid in an aqueous solution was characterized by a polymer layer thickness that increased with the initial monomer concentration but decreased when the reaction temperature was increased from 60° C. to 70° C. (See FIG. 9). For a reaction temperature of 60° C., the grafted polymer layer thickness increased from 5.2 to 7.1 nm (37% increase) for $[M]_0$=5 and 20 vol %, respectively, for a reaction period of 2 h. When the reaction temperature was increased from 60° C. to 70° C., the polymer layer thickness was reduced by 8% and 4% at$[M_0]$=5 and 20 vol %, respectively, after a period of 2 h.

It is hypothesized that initiator fragments from the surface or chain transfer may have resulted in the formation of polymer radicals in solution that may bind to surface sites via polymer grafting. Also, it should be noted that the decrease in polymer layer growth may also result from surface chain-chain combination reactions.

Atomic force microscopy (AFM) was used to study the morphology of the poly(methacrylic acid) grafted features on PA-PEI-silicon created by APPI-FRCP (See FIGS. 10a-10c). An increase in the initial monomer concentration from 5 to 20 vol % at 60° C. for APPI=FRGP of methacrylic acid on PA-PEI silicon resulted in almost a 100% increase in grafted polymer peak density (see Table 3), observed in the AFM surface image (See FIGS. 10a-10c). However, a decrease in the polymer feature size from a range of 70-120 nm to 10-30 nm was noted when the initial monomer concentration was increased from 5 to 20 vol %, respectively, evidenced by about a 60% decrease in both polymer volume and surface roughness. These findings show that while the polymer feature density increased (See Table 3), the polymer surface feature size decreased, for an increase from 5 to 20 vol % in initial monomer concentration. It may be expected that in a surface diffusion limited regime (i.e., at low initial monomer concentration), a low surface density of long chain grafted polymers would form. However, for increased initial monomer concentration, a higher rate of monomer initiation from surface activation sites is achieved, resulting in an increase in polymer surface density with more uniform polymer chain sizes. The change in polymer surface feature size with initial monomer concentration was observed from the feature height histograms (see FIGS. 11a-11c). For grafting conditions of $[M]_0$=5 vol % at 60° C., the large grafted polymer features with a feature diameter of 70-120 nm contributed to a large skewness ($S_{skew}$=3.35) from a normal Gaussian distribution in the feature height profile range of 6 to 15 nm. The distribution skewness decreased by 39% and 67% for an $[M]_0$ of 10 vol % and 20 vol %, suggesting an increase in the uniformity of the polymer surface features with monomer concentration. Also, the characteristic width of the distribution decreased with initial monomer concentration. These findings suggest that the physical properties of the grafted polymer layer, such as the surface density and polymer chain size, may be engineered by adjusting the initial monomer concentration and reaction temperature to create nanostructured surfaces with unique architectures.

Table 3 shows the polymer layer properties for plasma-induced graft polymerization of poly(methacrylic acid) on polyamide-PEI-silicon substrates for an initial monomer range of 5-20 vol %.

TABLE 3

Reaction Conditions

| $[M]_0$ (vol %)[a] | T (° C.) | $R_{rms}$ (nm) | $S_{skew}$ | Polymer Layer Thickness (nm) | Polymer Volume $(nm^3/\mu m^2)$ $(10^3)$ | Peak Number Density (feat/$\mu m^2$) | Feature Diameter (nm) |
|---|---|---|---|---|---|---|---|
| 5  | 60 | 2.33 | 3.35 | 5.2 | 5.6 | 297 | 70-120 |
| 10 | 60 | 1.50 | 2.05 | 6.3 | 4.3 | 463 | 50-80 |
| 20 | 60 | 0.88 | 1.10 | 7.1 | 2.1 | 605 | 10-30 |

[a]Plasma surface activation conditions of treatment time = 10 s and RF power = 40 W.

LFC1 RO membranes were compared to the surface nanostructured membranes (developed in the present study) to determine the impact of surface graft polymerization on membrane performance. The commercially available polyamide LFC1 RO membrane has a high surface roughness ($R_{rms}$=90.32 nm) and peak height of 651.9 nm (see Table 4), compared to the surface roughness demonstrated for nanostructured surfaces described above, due to the porous polysulfone support used for polyamide interfacial polymerization. ATR-FTIR spectroscopy was used to determine the impact of AP hydrogen plasma surface treatment on the LFC1 RO membrane surface (see FIG. 12). The FTIR spectrum for the polyamide LFC1 RO membrane surface (see FIG. 12) revealed C—C, C—O, C=O, and C—N bond bending and stretching between 600 to 1700 cm$^{-1}$, as well as O—H bond stretching between 3000 to 3500 cm$^{-1}$. The chemical functional groups evidenced in the FTIR spectra corresponded to the characteristic polyamide layer used in RO membranes. After the LFC1 RO membrane was hydrogen plasma treated for a period of 10 s at an RF power of 40 W, the FTIR spectra of the plasma activated surface exhibited an increase in the O—H (between 3000 to 3500 cm-1) and C—OH (between 900 to 1100 cm-1) absorbance peak intensities (see FIG. 12). The formation of C—OH groups was due to oxidation of the surface peroxides formed during plasma surface treatment, based on peroxide decomposition to form alcohols in ambient air.

Table 4 shows the surface roughness, skewness, and feature height for an LFC1 RO membrane and an NF composite membrane.

TABLE 4

|  | $R_{rms}$ (nm) | $S_{skew}$ | Feature Height (nm) |
|---|---|---|---|
| LFC1 RO Membrane | 90.32 | 0.72 | 651.9 |
| NF Composite Membrane | 77.29 | 0.36 | 469.8 |

The surface structured LFC1 RO membrane was prepared by APPI-FRCP using a 10 vol % methacrylic acid aqueous solution at 60° C. for 30 min, which corresponded to the formation of a 3 nm grafted polymer layer thickness on the RO membrane. Gypsum (calcium sulfate) salt scaling tests were conducted to compare the commercial LFC1 RO membrane and the poly(methaclic acid) grafted LFC1 RO membrane (see FIG. 13) using a scaling solution (composed of $CaCl_2$ and $Na_2SO_4$) with a gypsum saturation index of SIg=2.0. The concentration of gypsum salts in the feed stream was above the thermodynamic supersaturation limit to order to induce surface crystallization. A 0.2 μm microfilter, located downstream from the RO cell, was used to remove bulk crystals formed in solution prior to directing the retentate stream back to the feed reservoir.

The performance of the unmodified and surface structured LFC1 membranes was determined by monitoring the onset of crystal formation by the decrease in permeate flux, referred to as the apparent scaling induction time ($t_{ind}$) (see FIG. 13). The decline of permeate flux suggests scale formation on the surface, which reduces water permeation through the membrane and affects the membrane performance. It was noted, from the membrane sealing study, that the apparent scaling induction time increased by more than 25% for the poly (methacrylic acid) grafted RO membrane (420 min), relative to the unmodified RO membrane (330 min). Also, after a period of about 700 min, the polymer grafted membrane exhibited only an 18% decrease in the permeate flux decline ($F/F_o$, compared to a 38% decrease in the permeate flux decline observed for the unmodified RO membrane. The increased apparent scaling induction time suggested that the poly(methacylic acid) layer retards gypsum scale formation on the polyamide surface, presumably due to the reduced salt permeability of the water-soluble grafted poly(methacrylic acid) layer. The rate of gypsum salt scaling can be influenced by both the rate of nucleation and the diffusion-limited crystal growth rate. Accordingly, the rate of flux decline would imply either an increase in the rate of surface crystallization for the unmodified membrane or an otherwise change in the membrane permeability. However, an increase in the membrane resistance was observed for the grafted polymer RO membrane, compared to the unmodified membrane. For example, to maintain the same initial flux for the nanostructured membrane, a transmembrane pressure of about 500 psi was used for the poly(methacrylic acid) grafted RO membrane, compared to only about 200 psi for the unmodified RO membrane. The 150% increase the applied pressure required to maintain a baseline permeate flux was presumably due to narrowing of the membrane pores or partial blocking of the pore opening at the surface by grafted polymer chains. Water soluble, hydrophilic poly(methacrylic acid) chains swell in a good solvent such as water, and thus it is reasonable to expect that some degree of permeability reduction would be experienced. For example, it has been demonstrated that the water permeability of a poly(vinylpyrrolidone) grafted tubular membrane decreased by nearly an order of magnitude when the grafted polymer volume fraction increased by about 0.5%. This suggests that grafted polymer layers could potentially reduce permeate flow and add resistance to water flux though the membrane. The reduced permeability would subsequently add to the desalting operating costs, and thus such a nanostructured membrane would not be of practical interest. To circumvent the water permeability limitation of the polymer grafted LFC1 RO membrane, a nanofiltration (NF) membrane, with a higher permeate flux due to a larger membrane pore size, was synthesized and surface structured by APPI-FRCP for mineral salt scaling tests.

The nanofiltration (NF) composite membrane was formed by polyamide interfacial polymerization on a polysulfone-polyester membrane support. The surface topography of the NF membrane was slightly smoother than the commercial LFC1 RO membrane (see FIGS. 14a-14d), with a 14% and 30% decrease in surface roughness and surface feature height, respectively, compared to the RMS roughness of the LFC1 RO membrane (see Table 4). The permeate flux performance for the NF and LFC1 RO membranes showed that pure water flux was 30% higher for the NF membrane. The increased water permeate flux was expected, given that the procedure used to fabricate the NF membrane was chosen in order to increase the permeability, relative to the RO membranes. Due to the higher permeate flux through the NF membrane, the saturation index of gypsum salt at the membrane surface was reduced, leading to an increase in the apparent gypsum scale induction time, relative to the LFC1 RO membrane (see FIG. 15). Similarly, due to the higher permeability (presumably due to larger pore size) and correspondingly reduced permselectivity, the salt rejection at [NaCl]=1000 ppm for the unmodified NF membrane was considerably lower ($R_j$=32.5%, Table 5) than for the LFC1 RO membrane= ($R_j$=94.4%, see Table 5).

Table 5 shows the salt rejection at [NaCl]=1000 ppm for an a) unmodified LFC1 RO membrane, and an b) LFC1/poly (methyacrylic acid) membrane modified by APPI-FRGP ([M]0=10 vol %, T=60° C., t=30 minutes).

TABLE 5

|  | NaCl Salt Rejection[a] |
|---|---|
| Unmodified LFC1 RO Membrane | 94.4% |
| RO/poly(methacrylic acid) membrane[b] | 94.6% |

[a]Salt rejection at [NaCl] = 1000 ppm, $Q_p$ = 2.5 × $10^{-3}$ $cm^3$/s
[b]([M]$_0$ = 10 vol %, T = 60° C., treatment time = 10 s, RF power = 40 W)

Mineral salt scaling studies (see FIG. 16), conducted at $SI_g$=2, showed that the apparent scaling induction time ($t_{ind}$) increased with initial monomer concentration, with a $t_{ind}$ of about 300, 420, and 540 s at [M]$_0$=2.5, 7.5 and 10 vol %, respectively. In comparison, the unmodified LFC1 RO membrane resulted in a 330 min scaling induction time. The NF membranes were surface structured by APPI-FRCP at an initial monomer concentration range of 2.5 to 10 vol % methacrylic acid and 60° C. for 30 min. The graft polymerization reaction conditions were chosen to vary both the polymer chain size and graft density to determine the impact on surface scaling, while preventing the formation of long polymer chains that would lead to pore-blocking. For APPI-FRCP of methacrylic acid on PA-PEI-silicon surrogate substrates, an increase in initial monomer concentration would increase the grafted polymer layer and surface density while decreasing the surface roughness (see Table 3). Similarly, salt rejection studies showed that as the initial monomer concentration was increased from 2.5 to 10 vol %, the NaCl salt rejection at 1000 ppm increased from 94.5 to 95.4%, compared to a 94.4% salt rejection for the unmodified LFC1 RO membrane. These findings demonstrate that, as the polymer surface density and chain length increased, the apparent gypsum scaling induction time also increased, exhibiting a significant improvement in membrane performance (reduced scaling) compared to the unmodified LFC1 membrane. Also, the applied transmembrane pressure required to maintain the initial permeate flux was lower for the NF surface structured membranes than for the LFC1 RO membrane. The transmembrane pressure was 145, 150 and 155 psi for salt rejection tests with the grafted membranes at [M]$_0$=2.5, 7.5 and 10 vol %, respectively. In comparison, the applied transmembrane pressure for the unmodified LFC1 RO membrane at the same permeate flux conditions was about 200 psi. These studies show that AP-FRCP can be used to increase the selectivity of NF membranes (increased salt rejection) and create membranes which have performance properties similar to commercial RO membranes but with increased permeability and reduced membrane flux decline.

Table 6 shows salt rejection at [NaCl]=1000 ppm for an a) unmodified NF composite membrane and an NF composite membrane modified by grafted poly(methyacrylic acid) via APPI-FRGP at T=60° C., t=30 minutes, and [M]0=b) 2.5 vol %, c) 7.5 vol % and d) 10 vol % (treatment time=10 s, RF power=40 W).

TABLE 6

|  | NaCl Salt Rejection[a] |
|---|---|
| NF Composite Membrane | 32.5% |
| NF/PMA at [M]$_0$ = 2.5 vol %[b] | 94.5% |
| NF/PMA at [M]$_0$ = 7.5 vol %[b] | 94.7% |
| NF/PMA at [M]$_0$ = 10 vol %[b] | 95.4% |

[a]Salt rejection at [NaCl] = 1000 ppm, $Q_p$ = 2.5 × $10^{-3}$ $cm^3$/s
[b]([M]$_0$ = 10 vol %, T = 60° C., treatment time = 10 s, RF power = 40 W)

Other Examples and Data

FIGS. 17 and 18 are AFM images of RO membranes. FIG. 17 is a commercially available RO membrane. FIG. 18 is a polysep membrane. Table 7 provides the details of the images.

TABLE 7

|  | $R_{rms}$ (nm) | Feature Height (nm) |
|---|---|---|
| Commercial RO Membrane | 90.32 | 651.9 |
| Polysep Membrane | 77.29 | 469.8 |

FIGS. 19-20 illustrate the results of gypsum salt scaling and biopolymer membrane fouling studies.

FIG. 19 illustrates the gypsum salt scaling study performed on an RO membrane. The system used to test the membranes was similar to the system of FIG. 8. The system parameters were as follows: flow rate=130 mL/min, crossflow velocity=0.19 cm/s. The water composition was as follows: $SI_{CaSO4}$=2, [$CaCl_2$]=5.2 g/L, and [$Na_2SO_4$]=5.1 g/L. Table 8 summarizes the results.

TABLE 8

|  | NaCl Salt Rejection[a] |
|---|---|
| Unmodified Commercial RO Membrane | 94.4% |
| RO Membrane/GraftedPolymer-3 | 94.6% |

FIG. 20 illustrates the gypsum salt scaling study for the polysep membrane. In this example, the polymer layer thickness and the polymer surface coverage was greatest for grafted polymer-3, lowest for grafted polymer-1, and grafted polymer-2 was in the middle. Table 9 summarizes the results.

TABLE 9

|  | NaCl Salt Rejection[a] |
|---|---|
| Commercial RO Membrane | 94.4% |
| Polysep/GraftedPolymer-1 | 94.5% |
| Polysep/GraftedPolymer-2 | 94.7% |
| Polysep/GraftedPolymer-3 | 95.4% |

FIG. 21 illustrates the results of the study of biopolymer fouling of the membrane . In this example, the system parameters were as follows: flow rate=130 m/L min and crossflow rate=0.19 cm/s. In this example, bovine serum albumin at 500 ppm was used at a pH of 4.8 and a Mw of 64 KDa.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention.

Accordingly, unless specifically indicated herein, the order and grouping of the operations are not limitations of the invention.

What is claimed is:

1. A method of producing a reverse osmosis (RO) membrane, comprising:
   exposing a surface of a base membrane to an impinging atmospheric pressure plasma source to produce an activated surface, wherein the base membrane has a higher water permeability relative to a target water permeability, and the base membrane has a lower salt rejection relative to a target salt rejection; and
   exposing the activated surface to a solution including a vinyl monomer so as to produce a RO membrane including polymer chains that are chemically and terminally bonded to the base membrane, wherein the RO membrane has the target water permeability and the target salt rejection.

2. The method of claim 1, wherein the solution is an aqueous solution, and a concentration of the vinyl monomer in the solution is no greater than 20 vol %.

3. The method of claim 2, wherein the vinyl monomer includes a vinyl group and is water soluble.

4. The method of claim 1, wherein the polymer chains are configured to impart a surface charge to the RO membrane.

5. The method of claim 1, wherein exposing the activated surface to the solution including the vinyl monomer is carried out at a temperature of at least 60° C.

6. The method of claim 1, wherein exposing the surface to the impinging atmospheric pressure plasma source includes exposing the surface to an atmospheric pressure plasma for a period of between 5 and 40 seconds and at a power of between 10 and 60 watts.

7. The method of claim 1, wherein the base membrane allows for the formation of surface peroxides, epoxides, or other initiation sites by membrane surface treatment of the impinging atmospheric pressure plasma source.

8. The method of claim 1, wherein exposing the activated surface to the solution includes producing the RO membrane that is configured to resist mineral salt scaling and fouling.

9. The method of claim 1, wherein the monomer is methacrylic acid.

10. The method of claim 1, wherein exposing the surface to the impinging atmospheric pressure plasma source includes exposing the surface to an atmospheric pressure hydrogen plasma for a period of time between 5 and 40 seconds.

11. The method of claim 1, wherein exposing the surface to the impinging atmospheric pressure plasma source includes exposing the surface to an atmospheric pressure hydrogen plasma at a power between 10 and 60 watts.

12. The method of claim 1, wherein the base membrane has a pore size that is characteristic of a nanofiltration membrane.

13. The method of claim 1, wherein the target salt rejection of the RO membrane at [NaCl]=1000 ppm is at least 94.5%.

14. The method of claim 1, wherein the base membrane has a water permeability that is characteristic of a nanofiltration membrane.

15. A method of producing a reverse osmosis (RO) membrane, comprising:
   providing a base membrane, wherein the base membrane has a higher water permeability relative to a target water permeability; and
   forming a chemically and terminally grafted polymer layer on a surface of the base membrane to produce a RO membrane having the target water permeability, wherein forming the grafted polymer layer includes:
      exposing a surface of the base membrane to an impinging atmospheric pressure plasma source to form an activated surface; and
      exposing the activated surface to a solution including a vinyl monomer to form polymer chains terminally bonded to the base membrane.

16. The method of claim 15, wherein the base membrane corresponds to a nanofiltration membrane.

17. The method of claim 15, wherein the base membrane has a pore size that is characteristic of a nanofiltration membrane.

18. The method of claim 15, wherein the base membrane has a lower salt rejection relative to a target salt rejection of the RO membrane.

19. The method of claim 18, wherein the target salt rejection at [NaCl]=1000 ppm is at least 94.5%.

* * * * *